United States Patent
Oba et al.

(10) Patent No.: US 9,104,408 B2
(45) Date of Patent: Aug. 11, 2015

(54) IMAGE DISPLAY DEVICE, CONTROL METHOD AND COMPUTER PROGRAM

(75) Inventors: Haruo Oba, Kanagawa (JP); Yusuke Sakai, Kanagawa (JP); Tamaki Kojima, Kanagawa (JP); Kazumoto Kondo, Tokyo (JP); Naoki Okamoto, Tokyo (JP); Satoru Inoue, Tokyo (JP); Kazuyoshi Suzuki, Tokyo (JP); Yasuhisa Nakajima, Kanagawa (JP); Masahiro Nakano, Tokyo (JP); Takashi Tsurumoto, Saitama (JP)

(73) Assignee: Sony Corporation (JP)

( * ) Notice: Subject to any disclaimer, the term of this patent is extended or adjusted under 35 U.S.C. 154(b) by 608 days.

(21) Appl. No.: 12/737,697

(22) PCT Filed: Aug. 21, 2009

(86) PCT No.: PCT/JP2009/064625
§ 371 (c)(1),
(2), (4) Date: Feb. 8, 2011

(87) PCT Pub. No.: WO2010/021373
PCT Pub. Date: Feb. 25, 2010

(65) Prior Publication Data
US 2011/0135114 A1 Jun. 9, 2011

(30) Foreign Application Priority Data
Aug. 22, 2008 (JP) .............................. P2008-214618

(51) Int. Cl.
*G06K 9/00* (2006.01)
*G06F 1/32* (2006.01)
(Continued)

(52) U.S. Cl.
CPC ............ *G06F 1/3203* (2013.01); *G06F 1/3231* (2013.01); *G06F 1/3265* (2013.01);
(Continued)

(58) Field of Classification Search
None
See application file for complete search history.

(56) References Cited

U.S. PATENT DOCUMENTS

| 6,754,389 B1 * | 6/2004 | Dimitrova et al. ............ 382/224 |
| 7,379,568 B2 | 5/2008 | Movellan et al. |

(Continued)

FOREIGN PATENT DOCUMENTS

| JP | 07-084062 A | 3/1995 |
| JP | 9016296 | 1/1997 |

(Continued)

OTHER PUBLICATIONS

Kollreider et al., "Evaluating liveness by face images and the structure tensor", Oct. 17, 2005, Fourth IEEE Workshop on Autmatic Identification Advanced Technologies, pp. 75-80.*

(Continued)

*Primary Examiner* — Sumati Lefkowitz
*Assistant Examiner* — David Perlman
(74) *Attorney, Agent, or Firm* — Lerner, David, Littenberg, Krumholz & Mentlik, LLP

(57) ABSTRACT

Provided is an image display device provided with an image display unit for displaying a still image or a moving image, an image capturing unit for capturing the image in a direction in which the image display unit displays the image on the image display unit, and a face detection unit for performing, at predetermined intervals, face detection processing for detecting a face included in the image captured by the image capturing unit, wherein the predetermined intervals are variable according to whether or not the face of a user is included in the image captured by the image capturing unit, and when the position of the detected face does not change for a predetermined period of time in the face detection processing, the face detection unit does not detect the face as the face of the user.

27 Claims, 16 Drawing Sheets

(51) Int. Cl.
   *G09G 3/34* (2006.01)
   *H04N 5/63* (2006.01)
   *H04N 21/422* (2011.01)
   *H04N 21/4223* (2011.01)
   *H04N 21/4415* (2011.01)
   *H04N 21/442* (2011.01)
   *H04N 21/443* (2011.01)
   *H04N 21/45* (2011.01)
   *H04N 5/58* (2006.01)

(52) U.S. Cl.
   CPC ............... *G09G3/3406* (2013.01); *H04N 5/63* (2013.01); *H04N 21/4223* (2013.01); *H04N 21/42201* (2013.01); *H04N 21/42202* (2013.01); *H04N 21/4415* (2013.01); *H04N 21/4436* (2013.01); *H04N 21/44218* (2013.01); *H04N 21/4532* (2013.01); *G09G 2320/0626* (2013.01); *G09G 2330/021* (2013.01); *G09G 2354/00* (2013.01); *H04N 5/58* (2013.01); *Y02B 60/1242* (2013.01); *Y02B 60/1289* (2013.01)

(56) References Cited

U.S. PATENT DOCUMENTS

| | | | |
|---|---|---|---|
| 7,636,456 | B2 | 12/2009 | Collins et al. |
| 7,903,166 | B2* | 3/2011 | Daly ..................... 348/333.12 |
| 2006/0188234 | A1* | 8/2006 | Takeshita ..................... 386/107 |
| 2006/0262187 | A1* | 11/2006 | Takizawa ..................... 348/77 |
| 2007/0030375 | A1* | 2/2007 | Ogasawara et al. ...... 348/333.11 |
| 2007/0047775 | A1 | 3/2007 | Okubo |
| 2007/0089125 | A1* | 4/2007 | Claassen ..................... 725/9 |
| 2007/0126884 | A1* | 6/2007 | Xu et al. ..................... 348/220.1 |
| 2008/0010060 | A1 | 1/2008 | Asano et al. |
| 2008/0037839 | A1* | 2/2008 | Corcoran et al. ............. 382/118 |
| 2008/0215568 | A1* | 9/2008 | Yang et al. ..................... 707/5 |
| 2009/0262213 | A1 | 10/2009 | Watanabe |

FOREIGN PATENT DOCUMENTS

| | | |
|---|---|---|
| JP | 9120323 | 5/1997 |
| JP | 9190245 | 7/1997 |
| JP | 11242733 | 9/1999 |
| JP | 11288259 | 10/1999 |
| JP | 2000-221953 A | 8/2000 |
| JP | 2001005550 A | 1/2001 |
| JP | 2004-171490 A | 6/2004 |
| JP | 2004-213486 A | 7/2004 |
| JP | 2005-044330 A | 2/2005 |
| JP | 2005-115521 A | 4/2005 |
| JP | 2005-266061 A | 9/2005 |
| JP | 2005-267611 A | 9/2005 |
| JP | 2006-100881 A | 4/2006 |
| JP | 2006319853 A | 11/2006 |
| JP | 2007036702 A | 2/2007 |
| JP | 2007-065766 A | 3/2007 |
| JP | 2007-328675 A | 12/2007 |
| JP | 2007334092 A | 12/2007 |
| JP | 2008-099246 A | 4/2008 |
| JP | 2008-111886 A | 5/2008 |
| JP | 2008148297 A | 6/2008 |

OTHER PUBLICATIONS

"Active Apperance Models", Cootes et al., Computer Vision—ECCV '98, 5th European Conference on Computer Vision, Freiburg, Germany, Jun. 2-6, 1998 Proceedings, vol. II, pp. 484-498, 1998, IEEE Transactions on Pattern Analysis and Machine Intelligence, vol. 23, No. 6, Jun. 2001, pp. 681-685.

Office Action from Japanese Application No. 2010-525710, dated Mar. 12, 2013.

Office Action from Japanese Application No. 2010-525710, dated Dec. 3, 2013.

\* cited by examiner

IMAGE DISPLAY DEVICE, CONTROL METHOD AND COMPUTER PROGRAM

CROSS-REFERENCES TO RELATED APPLICATIONS

The present application is a national phase entry under 35 U.S.C. §371 of International Application No. PCT/JP2009/064625 filed Aug. 21, 2009, published on Feb. 25, 2010 as WO 2010/021373 A1, which claims priority from Japanese Patent Application No. JP 2008-214618 filed in the Japanese Patent Office on Aug. 22, 2008.

TECHNICAL FIELD

The present invention relates to an image display device, a control method, and a computer program.

BACKGROUND ART

The survey of Japan Electronics and Information Technology Industries Association (JEITA) says that an average time spent watching television (TV) a day is 4.5 hours. However, it is known that there are changes in lifestyles occurring recently, and that the 4.5 hours is not necessarily spent continuously watching TV.

For example, when a viewer watches TV while getting ready to go to work or school in the morning or while eating, he/she does not continuously watch a screen of the TV, may turn his/her glance or talk with another person when a program such as a weather forecast, for which input from the sound is sufficient, is broadcast. Thus, interesting keywords broadcast in the current news or sports news are taken as cues, upon which behavior of watching the screen of the TV again is frequent.

That is, a typical mode of watching TV involves merely turning the TV on in place of a clock in the morning, or hearing the sound of the TV at night while operating a personal computer (PC), and so-called "half watching" is increased. When this "half watching" is carried out, power is unnecessarily consumed in the state where the screen of the TV is turned on. As such, in the related art, to reduce power consumption, TVs have a mode of turning off the screen and continuing to play back only the audio.

SUMMARY OF INVENTION

Technical Problem

However, the conventional TV having the mode of continuing to play back only the audio has a problem in that it is impossible to automatically switch over the mode. In other words, it is necessary for the viewer to be conscious to operate the remote controller and to switch over the mode from the menu, and the TV is not suitable for frequent switchover of the mode, and is not fit for the use directed to energy conservation. As a result, the conventional TV having the mode of continuing to play back only the audio is not able to detect the watching situation of the viewer to automatically switch over the mode.

The present invention is made in view of the above-mentioned issue, and aims to provide an image display device, a control method, and a computer program, which are novel and improved, and which are capable of detecting the watching situation of a person from a captured image and thus automatically controlling the operation of an interior of the device according to the detected watching situation.

Solution to Problem

According to the first aspect of the present invention in order to achieve the above-mentioned object, there is provided an image display device, which includes: an image display unit for displaying a still image or a moving image; an image capturing unit for capturing the image in a direction in which the image display unit displays the still image or the moving image; and a face detection unit for carrying out face detection processing, in which a face of a user which is included in the image captured by the image capturing unit is detected, at given intervals, wherein the given intervals are variable according to whether or not the face of the user is included in the image captured by the image capturing unit, and when the detected face undergoes no change in position in whole or in part for a given time in the course of the face detection processing, the face detection unit does not detect the face as the face of the user.

With this configuration, the image display unit displays the still image or the moving image, and the image capturing unit captures the image in the direction in which the image display unit displays the still image or the moving image. Further, the face detection unit carries out the face detection processing, in which the user's face included in the image captured by the image capturing unit is detected, at the given intervals. The given intervals are variable according to whether or not the face of the user is included in the image captured by the image capturing unit. When the detected face undergoes no change in position in whole or in part for a given time in the course of the face detection processing, the face detection unit does not detect the face as the face of the user. As a result, it is possible to detect the watching situation of a person from the captured image, and to automatically control an operation situation according to the detected watching situation. Further, the intervals of the face detection processing of the face detection unit are changed according to whether or not the user's face is included in the image, and thereby it is possible to reduce a cost or power required for the face detection processing.

The image display device may further include a control unit for performing a control operation on the image display unit according to a result of the face detection processing of the face detection unit. As a result of the face detection processing of the face detection unit, when the user's face is not included in the image captured by the image capturing unit, the control unit may reduce luminance of the image display unit.

The control unit may reduce the luminance of the image display unit after a given time has elapsed after it is determined that the user's face is not included in the image captured by the image capturing unit.

The control unit may detect brightness of an installed room using the image captured by the image capturing unit, and may not reduce the luminance of the image display unit when the brightness of the room does not reach a given value.

After reducing the luminance of the image display unit, the control unit may raise the luminance of the image display unit when the face of the user is adopted to be included in the image captured by the image capturing unit.

When a given time has elapsed after the luminance of the image display unit is reduced, the control unit may partially or wholly omits image processing of the image displayed on the image display unit.

When it is determined that the face of the user is included in the image captured by the image capturing unit but the user shuts his/her eyes, the control unit may reduce the luminance of the image display unit after a given time has elapsed from the determination.

The image display device may further include a control unit for performing a control operation on the still image or the moving image according to a result of the face detection processing of the face detection unit, and the control unit may change a range of the image to be displayed on the image display unit according to a position of the face which the face detection unit detects and a distance of the face from the image capturing unit.

The image display device may further include a control unit for performing a control operation on the still image or the moving image according to a result of the face detection processing of the face detection unit, and the control unit may select the image to be displayed on the image display unit according to a situation of the face which the face detection unit detects.

The image display device may further include a control unit for performing a control operation on the still image or the moving image according to a result of the face detection processing of the face detection unit, and the control unit may control whether or not a high-resolution conversion processing is performed on the image to be displayed on the image display unit according to whether or not the face which the face detection unit detects is present.

The image display device may further include a control unit for performing a control operation on the still image or the moving image according to a result of the face detection processing of the face detection unit, and the control unit may automatically and sequentially switch over channels to be displayed on the image display unit according to whether or not the face which the face detection unit detects is present.

The image display device may further include: an audio output unit for outputting an audio; and a control unit for performing a control operation on the audio according to a result of the face detection processing of the face detection unit, and the control unit may control volume of the audio output from the audio output unit according to a situation of the face which the face detection unit detects.

The control unit may control the volume of the audio output from the audio output unit according to a direction and area of the face which the face detection unit detects.

The control unit may calculate the area of the face from the direction and area of the face which the face detection unit detects when the face is directed toward a front direction, and may control the volume of the audio output from the audio output unit using a result of the calculation.

The image display device may further include a control unit for performing a control operation on the still image or the moving image according to a result of the face detection processing of the face detection unit, and as a result of the face detection processing of the face detection unit, when it is determined that the face of the user is not included in the image captured by the image capturing unit, the control unit may temporarily stop playing back the moving image displayed on the image display unit.

The image display device may further include a control unit for performing a control operation on the still image or the moving image according to a result of the face detection processing of the face detection unit, and as a result of the face detection processing of the face detection unit, when it is determined that the face detected by the face detection unit shows a reaction to the image displayed on the image display unit, the control unit may set a mark for the image.

The control unit may set a chapter as the mark when the image displayed on the image display unit is the moving image.

The control unit may set the chapter at a point in time that goes back a given time from a point in time when the face detected by the face detection unit shows the reaction.

The image display device may further include a control unit for performing a control operation on the still image or the moving image according to a result of the face detection processing of the face detection unit, and the control unit may obtain an enjoying situation of the image displayed on the image display unit using the result of the face detection processing of the face detection unit.

The control unit may select the image to be displayed on the image display unit according to the enjoying situation.

According to the second aspect of the present invention in order to achieve the above-mentioned object, there is provided a control method including the steps of: capturing an image in a direction where an image display unit for displaying a still image or a moving image displays the still image or the moving image; and carrying out face detection processing, in which a face of a user which is included in the image captured in the capturing step is detected, at given intervals, to detect the face, wherein the given intervals are variable according to whether or not the face of the user is included in the image captured in the image capturing step, and wherein the step of detecting the face does not detect the face as the face of the user when the detected face undergoes no change in position in whole or in part for a given time in the course of the face detection processing.

According to the third aspect of the present invention in order to achieve the above-mentioned object, there is provided a computer program for causing a computer to execute the steps of capturing an image in a direction where an image display unit for displaying a still image or a moving image displays the still image or the moving image, and carrying out face detection processing, in which a face of a user which is included in the image captured in the capturing step is detected, at given intervals, to detect the face, wherein the given intervals are variable according to whether or not the face of the user is included in the image captured in the image capturing step, and wherein the step of detecting the face does not detect the face as the face of the user when the detected face undergoes no change in position in whole or in part for a given time in the course of the face detection processing.

Advantageous Effects of Invention

According to the present invention as described above, the image display device, the control method, and the computer program, which are novel and improved, can detect the watching situation of a person from a captured image, and thus automatically control the operation of an interior of the device according to the detected watching situation.

REFERENCE SIGNS LIST

Figure 1:
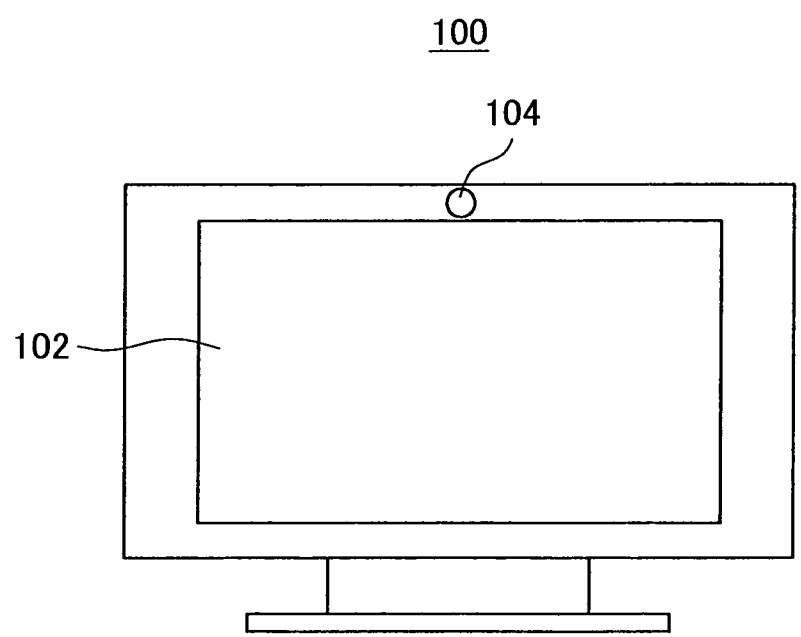
FIG. 1 is an explanatory diagram explaining the outline of an image display device 100 according to an embodiment of the present invention.

100 image display device
102 display panel
104 image input unit
106 face detection unit
108 power control unit
110 SDRAM
112 flash ROM
114 CPU
116 remote controller light receiving unit
118 network I/F
120 network terminal
122 terrestrial tuner
124 digital tuner
126 audio A/D conversion circuit
128 video decoder
130 MPEG decoder
132 audio signal processing circuit
134 video signal processing circuit
136 HDMI receiver
138 HDMI terminal
140 audio amplification circuit
142 speaker
144 graphic generation circuit
146 panel drive circuit
200 remote controller

DESCRIPTION OF EMBODIMENTS

Hereinafter, preferred embodiments of the present invention will be described in detail with reference to the appended drawings. Note that, in this specification and the drawings, elements that have substantially the same function and structure are denoted with the same reference signs, and repeated explanation is omitted.

Further, preferred embodiments of the present invention will be described in the following order.

[1] Outline of an image display device according to an embodiment of the present invention
[2] Operation of the image display device according to an embodiment of the present invention
  [2-1] Transition to a power saving mode
  [2-2] Restoration from a power saving mode
[3] Modification of the operation of the image display device according to an embodiment of the present invention
  [3-1] Change in frequency of detection
  [3-2] Pseudo display of a three-dimensional image
  [3-3] Automatic switchover of a channel
  [3-4] Volume control corresponding to a distance
  [3-5] Playback control of content
  [3-6] Setting of a mark to content
  [3-7] Detection of watching situation of content
[4] Conclusion

[1] OUTLINE OF AN IMAGE DISPLAY DEVICE ACCORDING TO AN EMBODIMENT OF THE PRESENT INVENTION

First, the outline of an image display device according to an embodiment of the present invention will be described. FIG. 1 is an explanatory diagram explaining the outline of an image display device 100 according to an embodiment of the present invention. Hereinafter, the outline of the image display device according to an embodiment of the present invention will be described using FIG. 1.

As shown in FIG. 1, the image display device 100 according to an embodiment of the present invention includes an image input unit 104 at an upper middle portion of a display panel 102 displaying a still image or a moving image, which captures the moving image. The image input unit 104 captures the moving image in a direction where the image display device 100 displays the still image or the moving image on the display panel 102. The image display device 100 according to the present embodiment analyzes the image captured by the image input unit 104, and detects the face of a user projected on the image. Then, according to whether the face of the user is contained in the moving image which the image display unit 104 captures, the image display device 100 is characterized in that it changes an internal operation state.

Further, in FIG. 1, the image display device 100 includes the image input unit 104, which captures the moving image at the upper middle portion of the display panel 102 for the image. However, in the present invention, it goes without saying that a position of the image input capturing the moving image is not limited to such an example. For example, a device other than the image display device 100 may be provided and connected to the image display device 100, and may capture the moving image. Further, it goes without saying that the number of image input units is not limited to one, and two or more image input units may be provided to capture an image.

The foregoing description has been made on the outline of the image display device 100 according to an embodiment of the present invention. Next, the configuration of the image display device 100 according to an embodiment of the present invention will be described.

Figure 2:
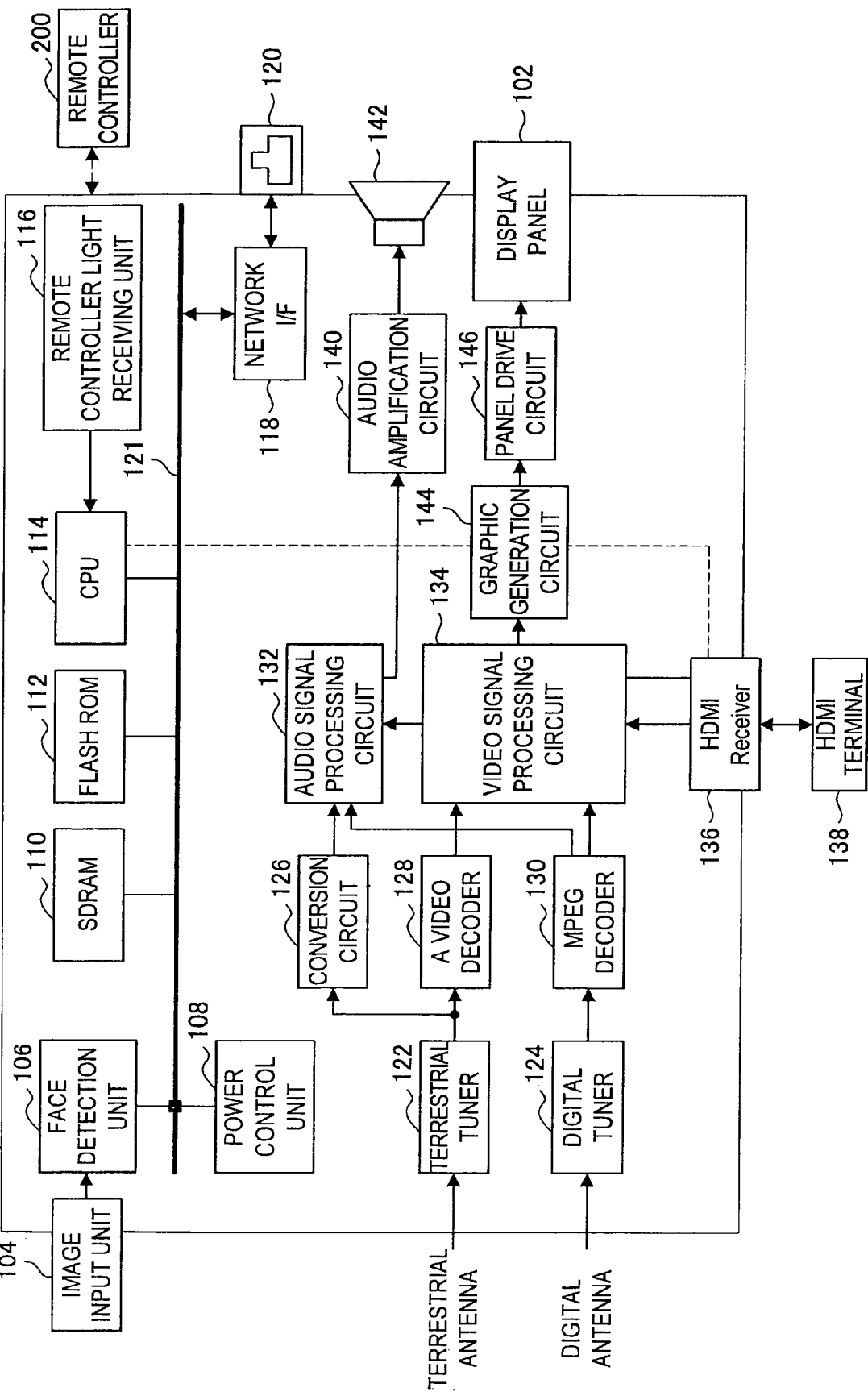
FIG. 2 is an explanatory diagram showing the configuration of the image display device 100 according to an embodiment of the present invention.

FIG. 2 is an explanatory diagram showing the configuration of the image display device 100 according to an embodiment of the present invention. Hereinafter, the configuration of the image display device 100 according to an embodiment of the present invention will be described using FIG. 2.

As shown in FIG. 2, the image display device 100 according to an embodiment of the present invention includes a display panel 102, an image input unit 104, a face detection unit 106, a power control unit 108, a synchronous dynamic random access memory (SDRAM) 110, a flash ROM 112, a CPU 114, a remote controller light receiving unit 116, a network I/F 118, a network terminal 120, a terrestrial tuner 122, a digital tuner 124, an audio A/D conversion circuit 126, a video decoder 128, an MPEG decoder 130, an audio signal processing circuit 132, a video signal processing circuit 134, a high-definition multimedia interface (HDMI) receiver 136, a HDMI terminal 138, an audio amplification circuit 140, a speaker 142, a graphic generation circuit 144, and a panel drive circuit 146.

The terrestrial tuner 122 receives a broadcast wave signal sent from a terrestrial antenna (not shown) receiving an analog ground wave, and demodulates a video signal and an audio signal, both of which are included in the broadcast wave signal, into baseband signals. Of the baseband signals demodulated by the terrestrial tuner 122, the audio signal is sent to the audio A/D conversion circuit 126, and the video signal is sent to the video decoder 128.

The digital tuner 124 receives a broadcast wave signal sent from a digital antenna (not shown) receiving digital broadcasting, and converts the received broadcast wave signal into an MPEG2-transport stream (MPEG2-TS). When the broadcast wave signal is converted into the MPEG2-TS by the digital tuner 124, the converted MPEG2-TS is sent to the MPEG decoder 130.

The audio A/D conversion circuit 126 receives the audio signal demodulated by the terrestrial tuner 122, and converts an analog audio signal into a digital audio signal. When the analog audio signal is converted into the digital audio signal by the audio A/D conversion circuit 126, the converted digital audio signal is sent to the audio signal processing circuit 132.

The video decoder 128 receives the video signal demodulated by the terrestrial tuner 122, and converts an analog video signal into a digital component signal. When the analog video signal is converted into the digital component signal by the video decoder 128, the converted digital component signal is sent to the video signal processing circuit 134.

The MPEG decoder 130 receives the MPEG2-TS sent from the digital tuner 124, and converts the MPEG2-TS into a digital audio signal in connection with audio and into a digital component signal in connection with video. When the MPEG2-TS is converted into the digital audio signal or the digital component signal by the MPEG decoder 130, the converted digital audio signal is sent to the audio signal processing circuit 132, and the converted digital component signal is sent to the video signal processing circuit 134.

The audio signal processing circuit 132 receives the digital audio signal sent from the audio A/D conversion circuit 126 or the MPEG decoder 130, and performs signal processing on the digital audio signal. When the signal processing is performed on the digital audio signal by the audio signal processing circuit 132, the audio signal is sent to the audio amplification circuit 140.

The video signal processing circuit 134 receives the digital component signal sent from the video decoder 128 or the MPEG decoder 130, and performs signal processing on the digital component signal. When the signal processing is performed on the digital component signal by the video signal processing circuit 134, the digital component signal is sent to the graphic generation circuit 144.

The HDMI receiver 136 receives a digital baseband signal input from the HDMI terminal 138 that is one of external input terminals. The digital baseband signal received by the HDMI receiver 136 is sent to the audio signal processing circuit 132 and the video signal processing circuit 134, in which the signal processing is carried out on the audio signal and the digital component signal, respectively. By connecting a cable to the HDMI terminal 138, the image display device 100 may be connected with, for instance, a recording and playback device that stores content and another content server.

The audio amplification circuit 140 receives the audio signal output from the audio signal processing circuit 132, amplifies it by a given amount, and outputs it. In the audio amplification circuit 140, the amount of amplification is based on a volume indicated by a user of the image display device 100. The audio signal amplified by the audio amplification circuit 140 is sent to the speaker 142. The speaker 142 outputs sound on the basis of the audio signal sent from the audio amplification circuit 140.

The graphic generation circuit 144 generates a graphic screen required to operate the image display device 100. The graphic screen required to operate the image display device 100 is differently generated by an operation of the user. The graphic screen generated by the graphic generation circuit 144 overlaps with the video signal sent from the video signal processing circuit 134 or is replaced with the video signal, and then is sent to the panel drive circuit 146. Further, when the graphic screen is not generated, the video signal sent from the video signal processing circuit 134 may be sent intact to the panel drive circuit 146.

The panel drive circuit 146 generates a panel drive signal, which is required to display an image on the display panel 102 from the graphic generation circuit 144, from the video signal sent from the graphic generation circuit 144. The panel drive signal generated by the panel drive circuit 146 is sent to the display panel 102. The display panel 102 is operated in response to the panel drive signal, so that the image is displayed on the display panel 102.

The display panel 102 displays a moving image on the basis of the panel drive signal sent from the panel drive circuit 146. In the present embodiment, the display panel 102 displays the moving image by means of liquid crystal.

As described above, the image input unit 104 is installed at the upper middle portion of the display panel 102 for images, and captures the moving image in the direction where the image display device 100 displays the moving image on the display panel 102 when the panel drive signal is supplied to the display panel 102, and thus the moving image is displayed on the display panel 102. The image input unit 104 may capture the moving image by means of a charge coupled device (CCD) image sensor or a complementary metal oxide semiconductor (CMOS) image sensor. The moving image captured by the image input unit 104 is sent to the face detection unit 106.

The face detection unit 106 inputs the moving image sent from the image input unit 104, and detects a face of the user which is contained in the moving image. The result of detecting the user's face at the face detection unit 106 is sent to the power control unit 108, the CPU 114, or the like, and is used to control the operation of the image display device 100. The operation of the image display device 100 that uses the result of detecting the user's face at the face detection unit 106 will be described below in detail.

The power control unit 108 controls the operation of each unit of the image display device 100 according to the detecting result of the face detection unit 106, thereby controlling the consumption of power of the image display device 100. Although the operation of the power control unit 108 will be described below in detail, one example thereof is described. For example, as a result of the detection of the face detection unit 106, when the user's face is not completely included in the moving image sent from the image input unit 104, it is determined that no one is looking at the moving image displayed on the display panel 102 of the image display device 100, and thus the power control unit 108 controls the luminance of the backlight of the display panel 102 to be reduced.

In this way, the power control unit 108 controls the operation of each unit of the image display device 100 according to the detecting result of the face detection unit 106. Thereby, it is possible to control the power consumption of the image display device 100 according to the situation where the moving image displayed on the image display device 100 is watched.

The SDRAM 110 is a temporary working region when the CPU 114 executes computer programs for controlling each unit of the image display device 100. The flash ROM 112 is a ROM in which the CPU 114 stores computer programs for controlling each unit of the image display device 100. Thus, the CPU 114 reads out the computer programs which are for controlling each unit of the image display device 100 and are stored in the flash ROM 112, and executes the computer programs in sequence.

The remote controller light receiving unit 116 receives a signal sent from a remote controller 200. The signal received by the remote controller light receiving unit 116 is input into the CPU 114, and the CPU 114 decodes a control code included in the signal. When the control code is decoded by the CPU 114, the CPU 114 controls each unit of the image display device 100 so as to carry out the operation (adjustment of volume, setting of a channel, display of a menu screen) corresponding to the control code.

The network I/F 118 receives a signal input from the network terminal 120 via a network, and sends a signal to the network through the network terminal 120. When the signal input from the network terminal 120 via the network is received by the network I/F 118, the received signal is sent to the CPU 114. The CPU 114 analyzes the signal which the network I/F 118 receives, and controls each unit of the image display device 100 so as to carry out the operation corresponding to the signal.

Further, the units of the image display device 100 are connected to each other by an internal bus 121, and are configured to be able to be controlled by the CPU 114.

The configuration of the image display device 100 according to an embodiment of the present invention has been described above. Next, the operation of the image display device 100 according to an embodiment of the present invention will be described.

[2] OPERATION OF THE IMAGE DISPLAY DEVICE ACCORDING TO AN EMBODIMENT OF THE PRESENT INVENTION

[2-1] Transition to a Power Saving Mode

Figure 3:
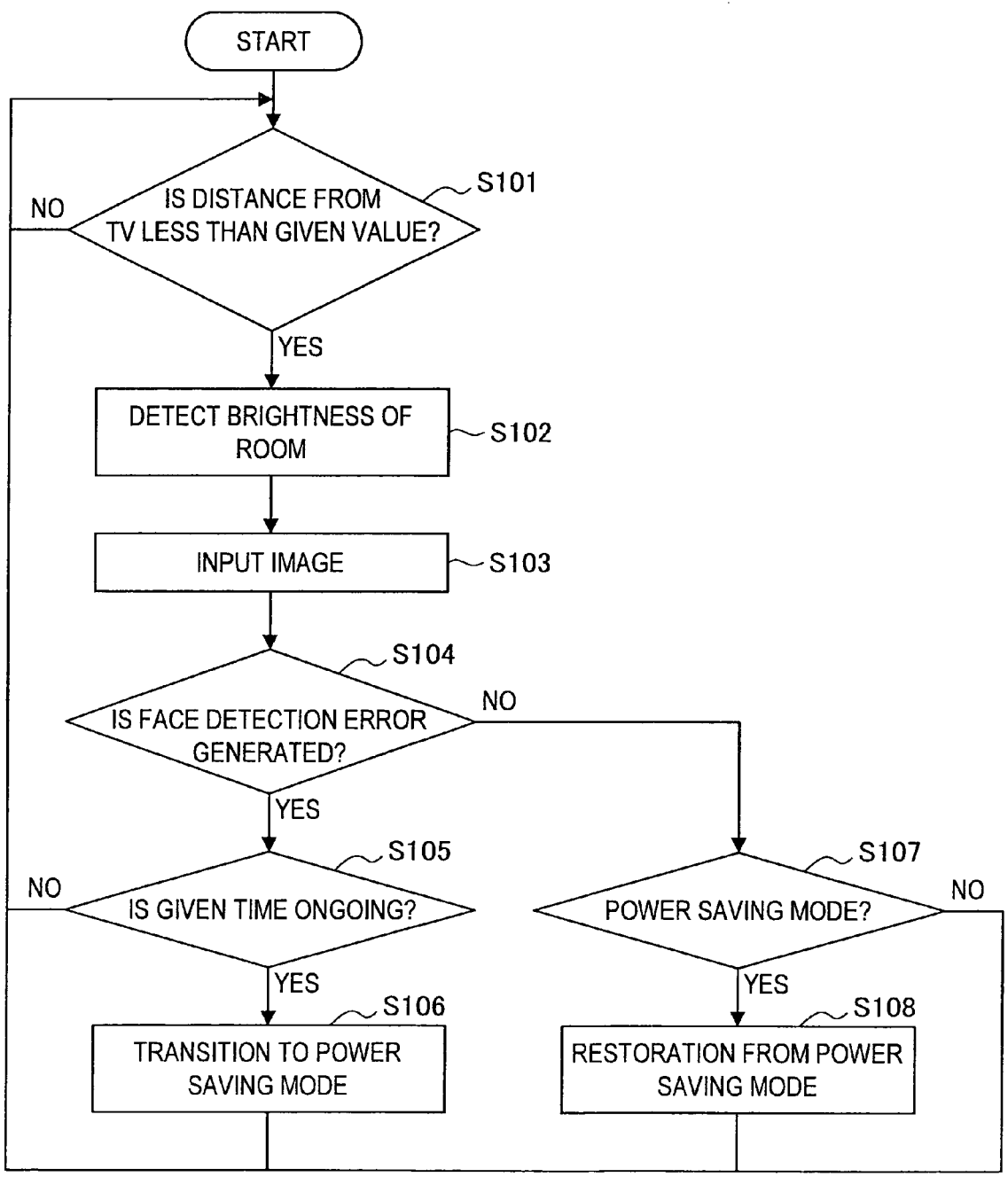
FIG. 3 is a flow chart explaining the operation of the image display device 100 according to an embodiment of the present invention.

FIG. 3 is a flow chart explaining the operation of the image display device 100 according to an embodiment of the present invention. Hereinafter, the operation of the image display device 100 according to an embodiment of the present invention will be described using FIG. 3.

In FIG. 3, when a panel drive signal is supplied from the panel drive circuit 146 to the display panel 102, and a moving image is displayed on the display panel 102, the operation of determining whether the face of a user is contained in an image captured by the image input unit 104 is described. The determination is made by the face detection unit 106, and the power control unit 108 controls the operation of the image display device 100 according to whether the user's face is contained in the image captured by the image input unit 104, and controls power consumption of the image display device 100.

When the moving image is captured by the image input unit 104, the moving image which the image input unit 104 captures is analyzed by the face detection unit 106, and a distance between the image display device 100 and a human being is measured from an area of the user's face that occupies the moving image which the image input unit 104 captures. As a result of the measurement, the face detection unit 106 determines whether the measured distance is nearer than a predetermined distance (step S101). Further, the distance between the image display device 100 and the viewer may not be strictly measured, and may be measured within an approximate range (e.g., the position of the face is 2.5 m to 3 m from the image input unit 104).

As a result of the determination of the face detection unit 106 in step S101, if the measured distance is nearer than the predetermined distance, this is not controlled by the power control unit 108. The process returns to step S101, and the determination processing of the face detection unit 106 is repeated. On the other hand, as a result of the determination of the face detection unit 106 in step S101, if the measured distance is farther than the predetermined distance, it is subsequently detected whether the brightness of the captured image reaches a given brightness, i.e. whether the brightness of a room where the image display device 100 is installed reaches a given brightness (step S102). In the determination of whether the given brightness is reached, an average value of the image is obtained by a CCD image sensor, for instance, when the image input unit 104 is made up of the CCD image sensor. Thus, the CPU 114 may determine whether the obtained average value of the image is more than a given value.

In the present embodiment, as a result of the brightness of the room in step S102, when it is determined that the brightness of the room where the image display device 100 is installed does not reach the given brightness, a process of lowering luminance of a backlight of the display panel 102 is not carried out. This is because, if the process of lowering the luminance of the backlight of the display panel 102 is carried out in a dark room where the brightness of the room where the image display device 100 is installed does not reach the given brightness, the entire room becomes too dark, and there is a chance of causing inconvenience when the light of the image display device 100 is illuminating the room. Of course, it goes without saying that the present invention is not limited to the relevant example. Even when the brightness of the room where the image display device 100 is installed does not reach the given brightness, the process of lowering the luminance of the backlight of the display panel 102 may be carried out. Further, the present invention may omit the process of detecting the brightness of the room for its own sake.

When the process of detecting whether the brightness of the room reaches the given brightness in step S102, the image from the image input unit 104 is subsequently input into the face detection unit 106 (step S103), and the face detection unit 106 carries out a process of detecting the face of a user.

The process of detecting the user's face (hereinafter, simply referred to as "face detection processing") in the face detection unit 106 may use technology disclosed, for instance, in Japanese Patent Application Publication No. 2007-65766 or No. 2005-44330. Hereinafter, the face detection processing will be described in brief.

To detect the user's face from the image, the position, size, and direction of the face are first detected from the supplied image. By detecting the position and size of the face, a part of the face image can be cut from the image. Thus, characteristic parts of the face (face characteristic positions), for instance, characteristic parts of eyebrows, eyes, a nose, and a mouth are detected from the cut face image and information about the direction of the face. The face characteristic positions can be detected, for instance, by applying a method called active appearance models (AAM). AAM is disclosed in the following literature.

T. F. Cootes, G. J. Edwards, and C. J. Taylor, "Active Appearance Models," Proc. Fifth European Conf. Computer Vision, H. Burkhardt and B. Neumann, eds, vol. 2, pp. 484-498, 1998

When the face characteristic positions are detected, a local characteristic amount is calculated for each of the detected face characteristic positions. By calculating the local characteristic amounts, and storing the calculated local characteristic amounts along with the face image, it is possible to discriminate the face from the image input from the image input unit 104. Since the method of discriminating the face can use technology disclosed, for instance, in Japanese Patent Application Publication No. 2007-65766 or No. 2005-44330, a detailed description thereof will be omitted here. Further, the face image or the face characteristic positions are able to determine whether the face projected on the supplied image is a man or a woman, and also an adult or a child.

In this way, the image, which is captured by the image input unit 104 and is input from the image input unit 104, can be subjected to the face detection processing by the face detection unit 106. Here, when the face detection unit 106 carries out the process of detecting the user's face, a face detection error, i.e. whether no user's face is present in the image input from the image input unit 104, is determined (step S104). As a result of the determination of step S104, when no user's face is present in the image input from the image input unit 104, and the face detection error is generated from the face detection unit 106, it is subsequently determined whether the face detection error lasts for a given time (e.g. 1 minute) (step S105).

As a result of the determination of step S105, when the face detection error lasts for the given time, the transition from an operation mode of the image display device 100 to a power saving mode is made by the power control unit 108 (step S106). When the transition from the operation mode of the image display device 100 to the power saving mode is made by the power control unit 108, the process returns to step S101 to determine the distance.

Here, the power saving mode in the present embodiment will be described. The power saving mode in the present embodiment refers to an operation mode of lowering the luminance of the image displayed on the display panel 102 to reduce power consumption of the image display device 100 by reducing operation parts of the image display device 100, lowering the luminance of the backlight of the display panel 102 when the display panel 102 includes the backlight, or reducing an amount of current when the display panel 102 is provided with a light emitting device that spontaneously emits light in response to the current amount. Further, although described below, the power saving mode may be provided in multiple steps. For example, a process of lowering the luminance of the backlight of the display panel 102 may be performed as a first step, and a process of stopping the operation of a circuit for achieving high resolution of the moving image or a circuit raising a frame rate may be performed as the next step. On the other hand, as a result of the determination of step S105, when the face detection error does not last for the given time in the face detection unit 106, the process returns to step S101 to determine the distance.

The following description is made using the case where the display panel 102 includes the backlight as an example. When the transition to the power saving mode is made, the luminance of the image displayed on the display panel 102 is reduced by lowering the luminance of the backlight of the display panel 102, and the power consumption of the image display device 100 is reduced.

Further, even when no one is looking at the moving image displayed by the display panel 102, there is a possibility of hearing sound emanated from the speaker 142, and thus the operation of a sound-related circuit may continue in the power saving mode without being stopped. In addition, when the power saving mode remains for a long time (e.g. 30 minutes to 1 hour) after the transition to the power saving mode, it is determined that the sound emanated from the speaker 142 is not heard, and the sound emanated from the speaker 142 is stopped from being output. To this end, the operation of the sound-related circuit may be stopped, or a power supply itself of the image display device 100 may be interrupted.

Further, even in the case where one or more user's faces are present in the image input from the image input unit 104, as a result of the face detection processing of the face detection unit 106, when it is determined that the person's eyes remain shut for a given time, it may be determined that the person is asleep and is not watching the image displayed on the display panel 102, and the transition to the power saving mode may be made by the power control unit 108.

As a result of the determination of step S105, when one or more user's faces are present in the image input from the image input unit 104, and the face detection error is not generated from the face detection unit 106, i.e. when someone is looking at the moving image displayed on the display panel 102, it is determined, for instance, by the power control unit 108 whether the operation mode of the image display device 100 is the power saving mode at that point in time (step S107). As a result of the determination of step S107, when it is determined whether the operation mode of the image display device 100 is not the power saving mode, the process returns to step S101 to determine the distance. On the other hand, as a result of the determination of step S107, when it is determined whether the operation mode of the image display device 100 is the power saving mode, a process of restoring from the power saving mode is carried out (step S108). The process of restoring from the power saving mode refers to, for instance, a process of raising the lowered luminance of the backlight of the display panel 102 again, or a process of increasing the reduced operation parts of the image display device 100 again. Thus, when the process of restoring from the power saving mode is carried out, the process returns to step S101 to determine the distance.

The operation of the image display device 100 according to an embodiment of the present invention has been described above using FIG. 3. Next, the process of transitioning to the power saving mode of step S106 of FIG. 3 will be described in greater detail.

Figure 4:
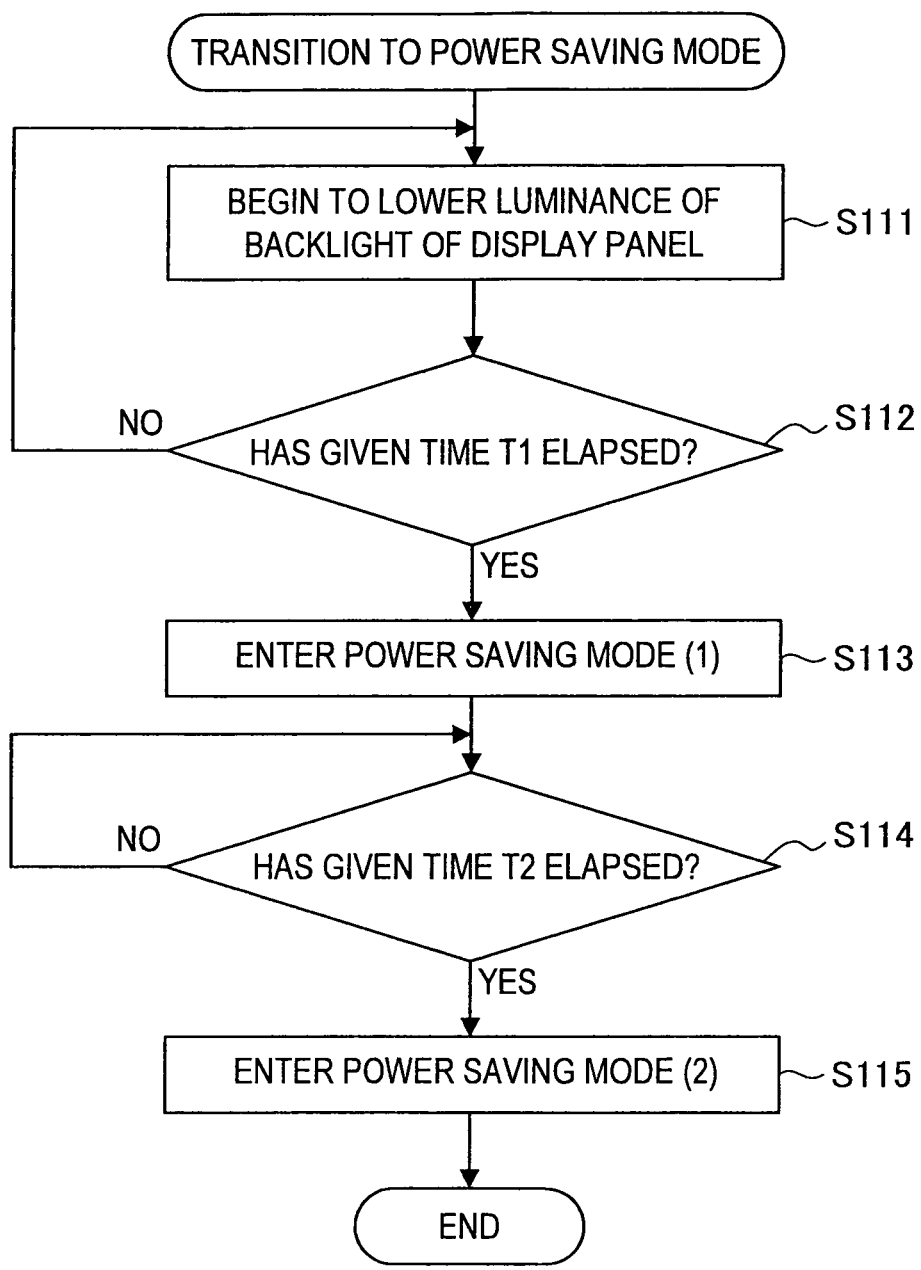
FIG. 4 is a flow chart explaining a process of transitioning to a power saving mode in the image display device 100 according to an embodiment of the present invention.

FIG. 4 is a flow chart explaining a process of transitioning to a power saving mode in the image display device 100 according to an embodiment of the present invention. Hereinafter, in the image display device 100 according to an embodiment of the present invention, the process of transitioning to the power saving mode will be described in greater detail.

In the image display device 100 according to an embodiment of the present invention, to make the transition to the power saving mode, first, the power control unit 108 controls the luminance of the backlight of the display panel 102 to begin to be lowered (step S111). Subsequently, when the process of lowering the luminance of the backlight of the display panel 102 is carried out, the power control unit 108 determines whether a given time T1 has elapsed after the luminance of the backlight of the display panel 102 begins to be lowered (step S112).

As a result of the determination of the power control unit 108 in step S112, if the given time T1 has not yet elapsed after the luminance of the backlight of the display panel 102 begins to be lowered, the process returns to step S111, and the control of lowering the luminance of the backlight of the display panel 102 is continued. On the other hand, as a result of the determination of the power control unit 108 in step S112, if the given time T1 has elapsed after the luminance of the backlight of the display panel 102 begins to be lowered, the operation mode of the image display device 100 is transitioned to the power saving mode (1) by the power control unit 108 (step S113). In the present embodiment, the power saving mode (1) refers to an operation mode of reducing power consumption, for instance, by causing the operation of the video signal processing circuit 134, which converts a quality of the moving image to be displayed on the display panel 102 into a high quality, to be stopped in whole or in part by the power control unit 108.

In step S113, when the operation mode of the image display device 100 is transitioned to the power saving mode (1) by the power control unit 108, the power control unit 108 next determines whether a given time T2 has elapsed after the operation mode of the image display device 100 is transitioned to the power saving mode (1) (step S114).

As a result of the determination of the power control unit 108 in step S114, if the given time T2 has not yet elapsed after the operation mode of the image display device 100 is transitioned to the power saving mode (1), the power control unit 108 continues the determination of step S114 until the given time T2 has elapsed. On the other hand, as a result of the determination of the power control unit 108 in step S114, if the given time T2 has elapsed after the operation mode of the image display device 100 is transitioned to the power saving mode (1), the operation mode of the image display device 100 is transitioned to a power saving mode (2) by the power control unit 108 (step S115). In the present embodiment, the power saving mode (2) refers to an operation mode of reducing power consumption, for instance, by causing the operation of the video signal processing circuit 134 for converting a frame rate of the moving image to be displayed on the display panel 102 to be stopped in whole or in part by the power control unit 108.

In this way, the power control unit 108 controls the internal operation of the image display device 100 on the basis of the elapsing of time, and thereby it is possible to change the power consumption of the image display device 100 step by step. The process of transitioning to the power saving mode in the image display device 100 according to an embodiment of the present invention has been described above. Next, the process of restoring from the power saving mode in the image display device 100 according to an embodiment of the present invention will be described in greater detail.

[2-2] Restoration from a Power Saving Mode

Figure 5:
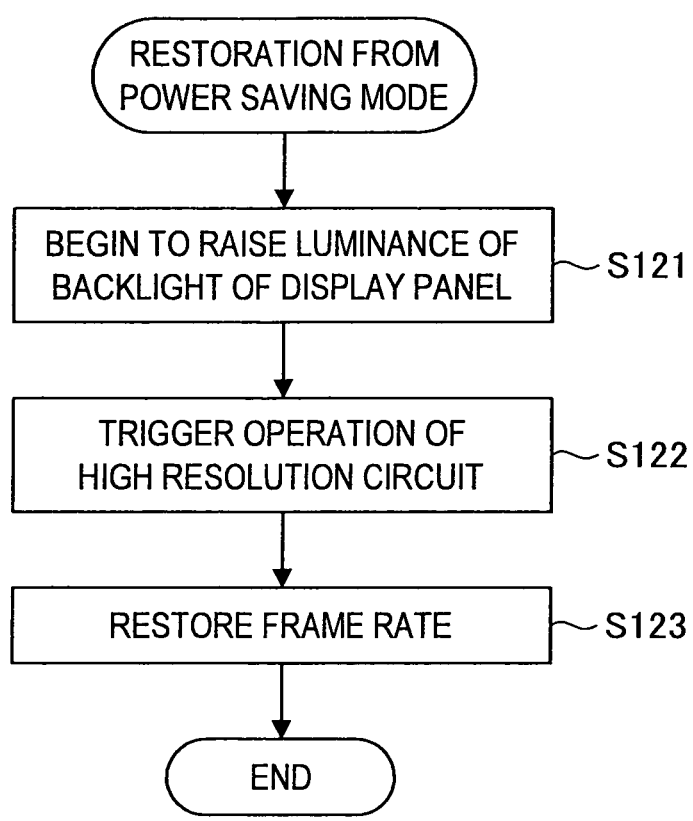
FIG. 5 is a flow chart explaining a process of restoring from a power saving mode in the image display device 100 according to an embodiment of the present invention.

FIG. 5 is a flow chart explaining a process of restoring from a power saving mode in the image display device 100 according to an embodiment of the present invention. Hereinafter, the process of restoring from the power saving mode in the image display device 100 according to an embodiment of the present invention will be described in greater detail using FIG. 5.

In the image display device 100 transitioned to the power saving mode in accordance with an embodiment of the present invention, to restore from the power saving mode, first, the power control unit 108 controls the luminance of the backlight of the display panel 102, which was lowered in the course of the transition to the power saving mode, to begin to be raised again (step S121).

In step S121, when the power control unit 108 controls the luminance of the backlight of the display panel 102 to begin to be raised again, and subsequently, when the operation of a high resolution circuit (e.g., the video signal processing circuit 134 for carrying out signal processing on the moving image to be displayed on the display panel 102) has been stopped in the power saving mode, the power control unit 108 controls the stopped operation of the high resolution circuit to be triggered again (step S122).

In step S122, when the power control unit 108 controls the operation of the high resolution circuit, which has been stopped in the power saving mode, to be triggered again, and subsequently when a process of reducing the frame rate is carried out in the power saving mode (e.g. by the power control unit 108 controlling the operation of the video signal processing circuit 134), the power control unit 108 controls the frame rate to be restored (step S123).

Further, in the process of restoring from the power saving mode in the image display device 100 shown in FIG. 5 in accordance with an embodiment of the present invention, the restoration from the power saving mode occurs in the order of the raising of the luminance of the backlight, the re-triggering of the operation of the high resolution circuit, and the restoring of the frame rate. However, in the present invention, it goes without saying that the restoration from the power saving mode is not limited to such an order.

The process of restoring from the power saving mode in the image display device 100 according to an embodiment of the present invention has been described above using FIG. 5. Next, FIGS. 6 through 8 explain the process of transitioning to the power saving mode and the process of restoring from the power saving mode in the image display device 100 according to an embodiment of the present invention by way of some examples.

Figure 6:
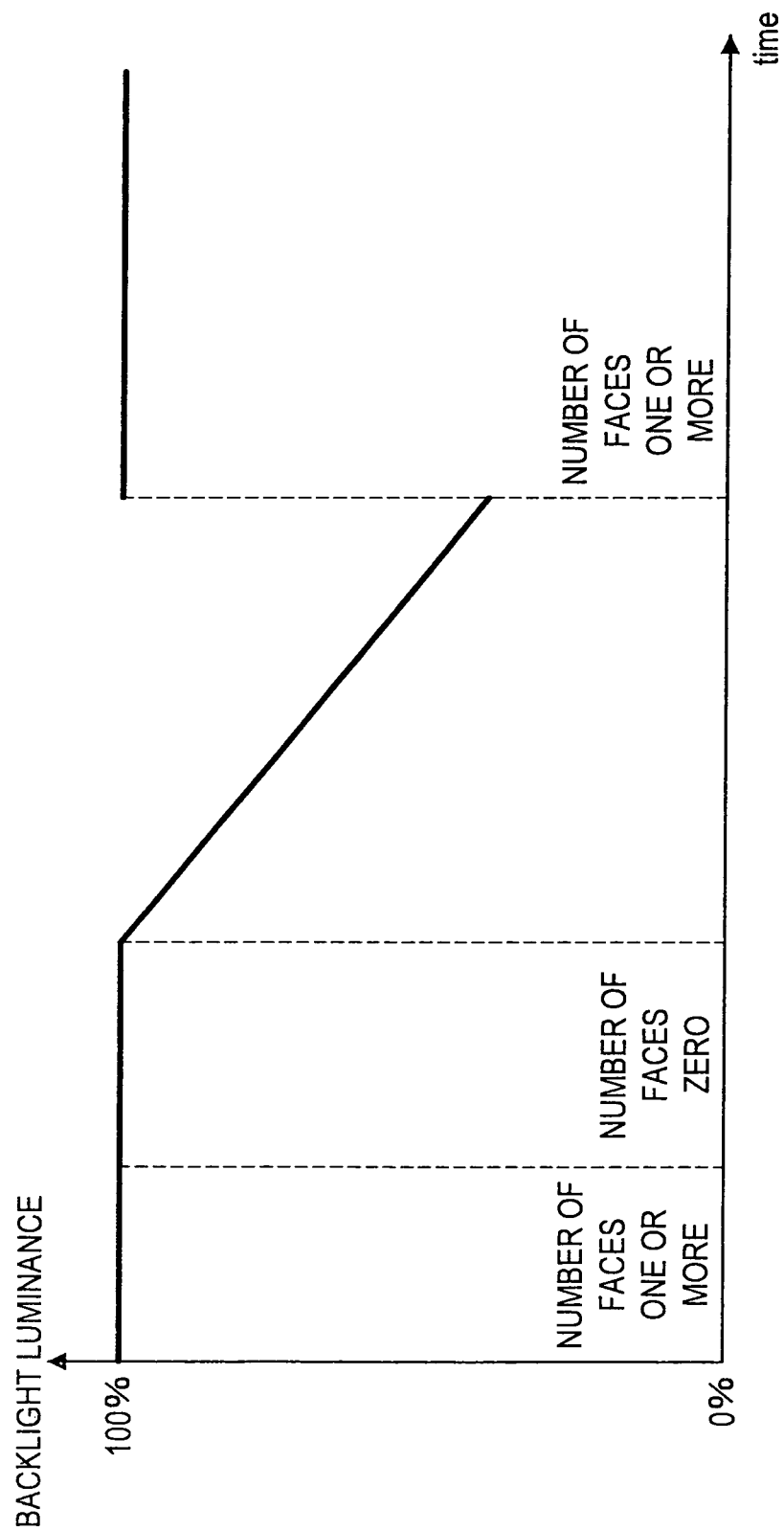
FIG. 6 is an explanatory diagram showing an example of the change in luminance of a backlight in a graph in the image display device 100 according to an embodiment of the present invention.
Figure 7:
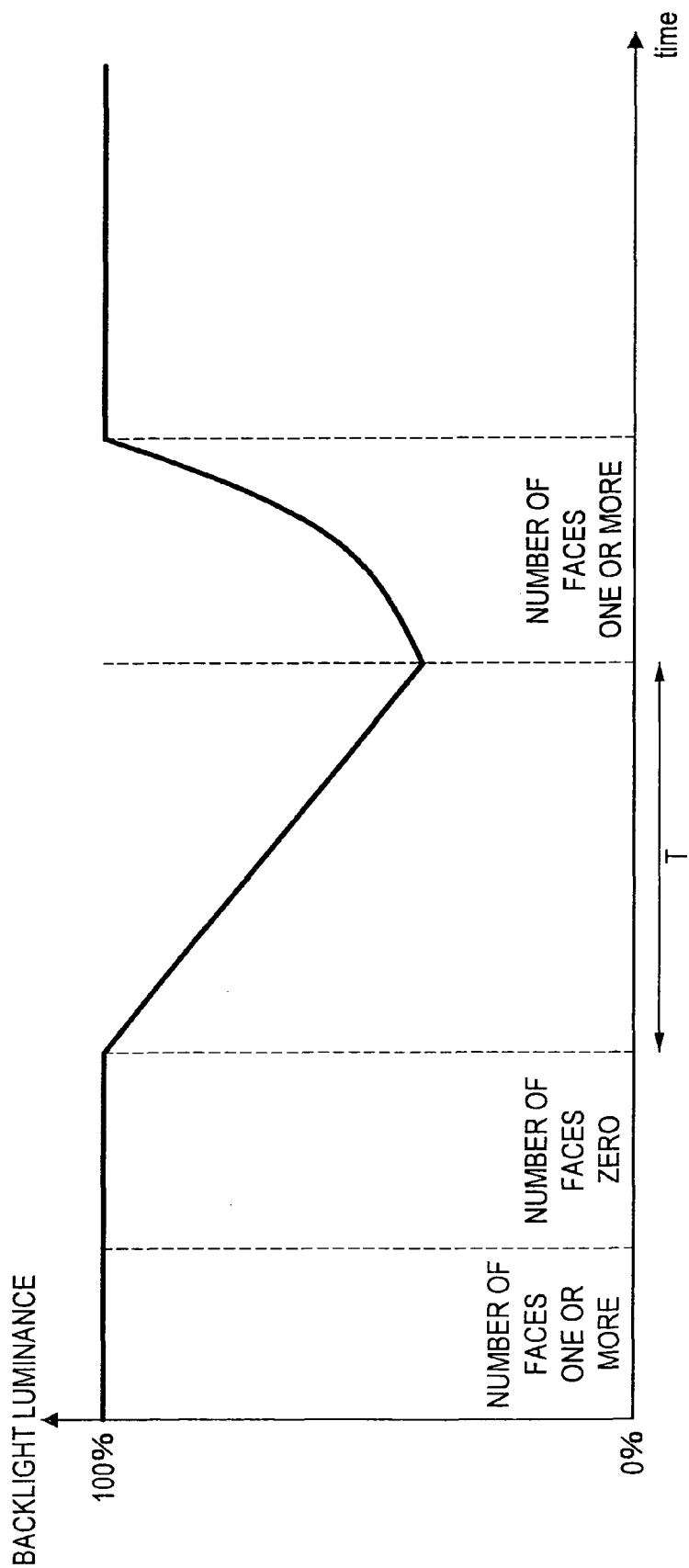
FIG. 7 is an explanatory diagram showing another example of the change in luminance of a backlight in a graph in the image display device 100 according to an embodiment of the present invention.
Figure 8:
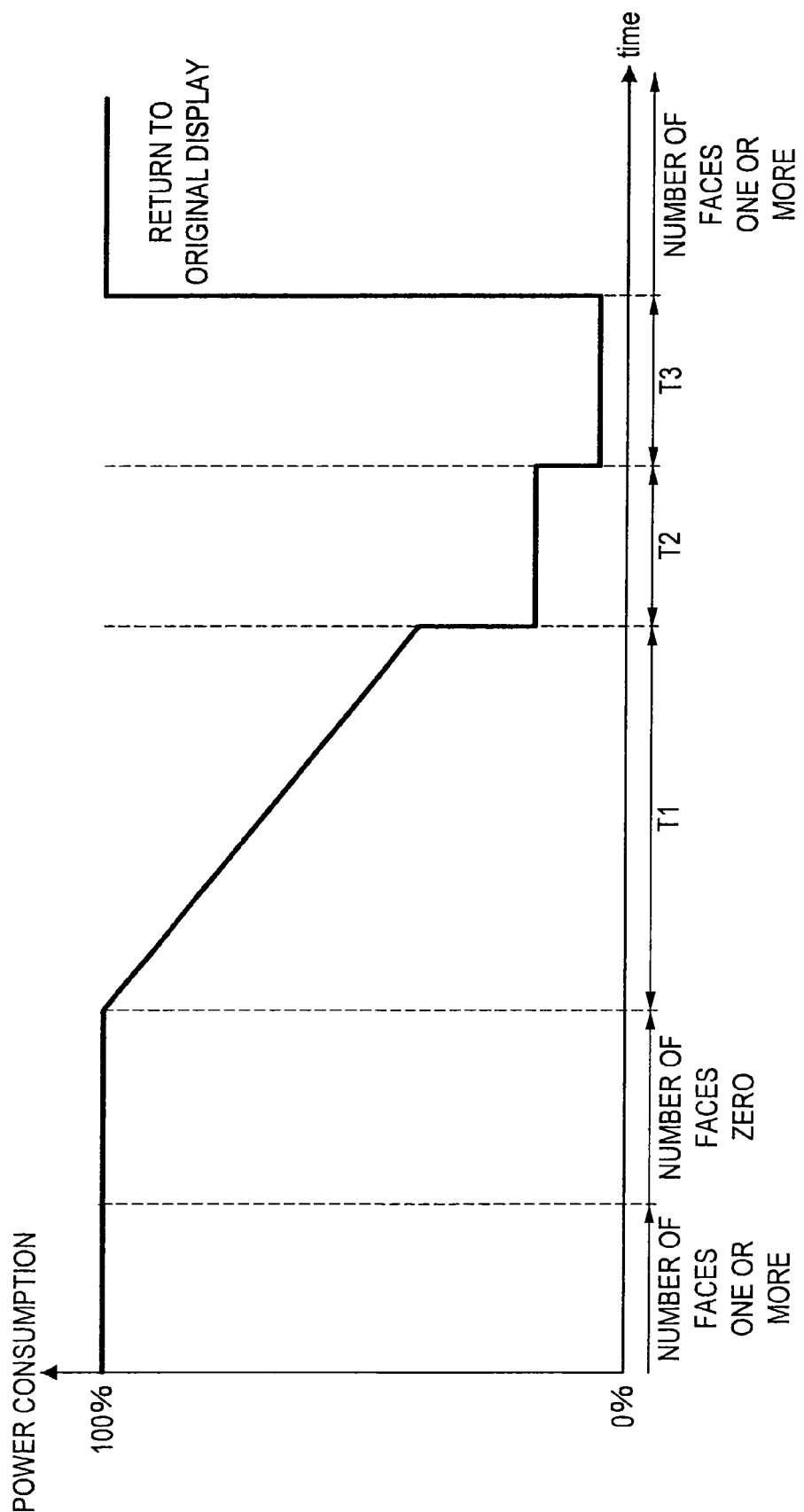
FIG. 8 is an explanatory diagram showing an example of the change in consumption of power in a graph in the image display device 100 according to an embodiment of the present invention.

FIGS. 6 through 8 are explanatory diagrams showing an example of a change in luminance or power consumption of the backlight of the display panel 102 when the process of transitioning to the power saving mode and the process of restoring from the power saving mode are performed in the image display device 100 according to an embodiment of the present invention.

FIG. 6 shows an example of a change in luminance of the backlight of the display panel 102 in a graph when the process of transitioning to the power saving mode and the process of restoring from the power saving mode are performed in the image display device 100 according to an embodiment of the present invention. In the graph shown in FIG. 6, the longitudinal axis shows the luminance of the backlight of the display panel 102, and the transverse axis shows the time.

As a result of the face detection processing of the face detection unit 106, when one or more user's faces are included in the image which the image input unit 104 inputs, the luminance of the backlight of the display panel 102 is not lowered. However, as a result of the face detection processing of the face detection unit 106, when a given time has elapsed after no user's face is contained in the image which the image input unit 104 inputs, the luminance of the backlight of the display panel 102 is gradually reduced by the power control unit 108.

Afterwards, as a result of the face detection processing of the face detection unit 106, when one or more user's faces are adopted to be again included in the image which the image input unit 104 inputs, the luminance of the backlight of the display panel 102 instantly returns to original luminance. In this way, as a result of the face detection processing of the face detection unit 106, when a given time has elapsed after no user's face is contained in the image which the image input unit 104 inputs, the luminance of the backlight of the display panel 102 is reduced as no one watches the video, and thereby it is possible to reduce the power consumption.

Further, in FIG. 6, when the luminance of the backlight of the display panel 102 returns to the original luminance by means of the power control unit 108, the luminance of the backlight of the display panel 102 instantly returns to the original luminance by means of the power control unit 108. It goes without saying that the present invention is not limited to such an example. FIG. 7 shows another example of a change in luminance of the backlight of the display panel 102 in a graph when the process of transitioning to the power saving mode and the process of restoring from the power saving mode are performed in the image display device 100 according to an embodiment of the present invention.

As a result of the face detection processing of the face detection unit 106, when one or more user's faces are included in the image which the image input unit 104 inputs, the luminance of the backlight of the display panel 102 is not lowered. However, as a result of the face detection processing of the face detection unit 106, when a given time has elapsed after no user's face is contained in the image which the image input unit 104 inputs, the luminance of the backlight of the display panel 102 is gradually reduced by the power control unit 108.

The description so far has been the same as the example shown in FIG. 6, but the description from here is different from the example shown in FIG. 6. Afterwards, as a result of the face detection processing of the face detection unit 106, when one or more user's faces are adopted to be again included in the image which the image input unit 104 inputs, the luminance of the backlight of the display panel 102 returns to original luminance by the power control unit 108. The luminance of the backlight of the display panel 102 may instantly return to original luminance or may gradually return to original luminance. The luminance of the backlight of the display panel 102 gently returns to original luminance, so that it is possible to spontaneously adjust the brightness when someone begins to watch the video.

FIG. 8 shows an example of a change in power consumption of the image display device 100 in a graph when the process of transitioning to the power saving mode and the process of restoring from the power saving mode are performed in the image display device 100 according to an embodiment of the present invention. In the graph shown in FIG. 8, the longitudinal axis shows the power consumption of the image display device 100, and the transverse axis shows the time.

As a result of the face detection processing of the face detection unit 106, when one or more user's faces are included in the image which the image input unit 104 inputs, the luminance of the backlight of the display panel 102 is not lowered. However, as a result of the face detection processing of the face detection unit 106, when a given time has elapsed after no user's face is contained in the image which the image input unit 104 inputs, the luminance of the backlight of the display panel 102 is gradually reduced by the power control unit 108.

Afterwards, when a given time T1 has elapsed after the luminance of the backlight of the display panel 102 begins to be gradually reduced by the power control unit 108, subsequently, the operation of a circuit for achieving high resolution of the moving image is stopped by the power control unit 108, and thus the power consumption is reduced by one step. Thus, when a given time T2 has further elapsed after the operation of the circuit for achieving high resolution of the moving image is stopped by the power control unit 108, the frame rate is subsequently reduced by the power control unit 108, so that the power consumption is further reduced by one step.

Further, in the graph shown in FIG. 8, the case where, after a time T3 has elapsed after the frame rate is reduced by the power control unit 108, as a result of the face detection processing of the face detection unit 106, one or more user's faces are adopted to be included in the image which the image input unit 104 inputs is shown. Thus, the case where, as one or more user's faces are adopted to be included in the image, the power control unit 108 raises the luminance of the backlight of the display panel 102, re-triggers the operation of the circuit for achieving the high resolution, and restores the frame rate, so that the power consumption is restored is shown.

Further, there is the case where it takes time to restore from the lowered state of the frame rate. In this case, a message that indicates the state of a system referring to, for instance, "being restored from the power saving mode," may be adopted to be displayed on the display panel 102 in the course of the restoration. By displaying such a message, the viewer is notified of the situation of the system, and thus it is possible to show that there is no failure.

Furthermore, if anything such as a poster on which a human face is shown is contained in the image captured by the image input unit 104, there is a chance of performing the face detection even from such a poster. As such, in the course of the face detection processing of the face detection unit 106, a canceling function may be provided for a still image. In detail, in the course of the face detection processing of the face detection unit 106, either an entire face or a face where positions of the eyes, nose, mouth, ears and the other parts of the face do not move for a given time or more may be processed as a still image so as not to be recognized to be the user's face. Moreover, in the course of the face detection processing of the face detection unit 106, when it is determined from the pitched angle of a visual line that the moving image displayed on the display panel 102 is being watched in a looking-up state, a message that urges a change in the watching position may be displayed in order to prevent, for instance, dry eyes.

Furthermore, the face detection processing of the face detection unit 106 may be combined with a human detection sensor. If it is known that a person is present in a room, the display panel 102 may display the moving image normally even when a person is beyond the viewing angle of a camera.

Further, if the image display device 100 is connected with a recording and playback device or the like, the playback may be continued. Furthermore, in the course of the restoration from the power saving mode, if the human detection sensor can detect a person before the person enters a viewing angle of the image input unit 104, the restoration from the power saving mode may be carried out when the human detection sensor detects the person prior to the input from the image input unit 104. Since the restoration can be previously initiated before the person enters the viewing angle of the image input unit 104, the restoration from the power saving mode can be carried out at a high speed.

In this way, according to the image display device 100 according to an embodiment of the present invention, the image input unit 104 captures the image, and the face detection unit 106 performs the face detection processing of detecting the user's face included in the image. Thus, using the result of the face detection processing, the luminance of the image displayed on the display panel 102 is reduced, or the image processing is omitted in part or in whole, so that it is possible to reduce the power consumption of the image display device 100. In the related art, it is understood whether to transition to the power saving mode on the basis of the time elapsed from the state where the user does nothing or using a sensor based on infrared or ultrasound. However, it is difficult to widen or narrow the range which the sensor covers on the basis of usage environment of the user, and furthermore it is impossible to set the time elapsed for each of various situations where the user is located in front of the image display device and where the user is watching the image displayed by the image display device. In the present embodiment, whether or not the user is located in front of the image display device 100 becomes the criterion of determination, and furthermore it is unnecessary for the user to do anything after the power saving mode.

Further, in the related art, to restore from the power saving mode, it is necessary for the user to do something. In contrast, in the present embodiment, since whether or not the user is located in front of the image display device 100 becomes the criterion of determination, it is unnecessary for the user to do something to restore from the power saving mode.

[3] MODIFICATION OF THE OPERATION OF THE IMAGE DISPLAY DEVICE ACCORDING TO AN EMBODIMENT OF THE PRESENT INVENTION

It is possible to apply various modifications to the face detection processing of the face detection unit 106. Hereinafter, the various modifications applied to the face detection processing of the face detection unit 106 will be described.

[3-1] Change in Frequency of Detection

Figure 9:
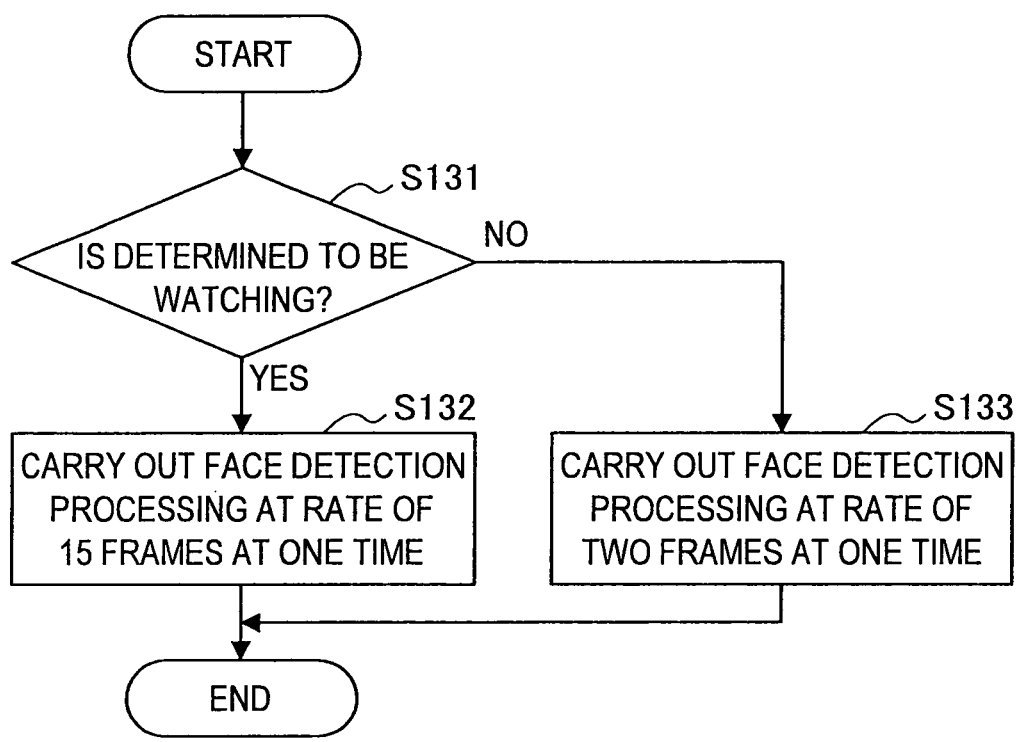
FIG. 9 is a flow chart explaining a modification of face detection processing in the image display device 100 according to an embodiment of the present invention.

FIG. 9 is a flow chart explaining a modification of face detection processing of the face detection unit 106 in the image display device 100 according to an embodiment of the present invention. Hereinafter, the modification of the face detection processing of the face detection unit 106 in the image display device 100 according to an embodiment of the present invention will be described using FIG. 9.

The flow chart shown in FIG. 9 is a chart in which the frequency of face detection processing is changed depending on whether or not the user's face is contained in the image input by the image input unit 104 in the course of the face detection processing of the face detection unit 106. The face detection processing is processing in which an amount of computation is increased. When the face detection processing is performed on all frames of the image input by the image input unit 104, a high-performance operation system is required, and furthermore the power consumption is increased. As such, the face detection processing is performed on the frames sampled to some extent rather than all the frames, so that it is possible to prevent the power consumption from being increased.

First, the face detection unit 106 determines whether the user's face is contained in the image input by the image input unit 104, and whether at least one person is watching the image displayed on the display panel 102 (step S131).

As a result of the determination of step S131, when the face detection unit 106 determines that the user's face is contained in the image input by the image input unit 104 and that at least one person is watching the image displayed on the display panel 102, the face detection unit 106 carries out the face detection processing at a rate of 15 frames at one time (step S132). On the other hand, when the face detection unit 106 determines that no one is watching the image displayed on the display panel 102, the face detection unit 106 carries out the face detection processing at a rate of 2 frames at one time (step S133).

In this way, since the amount of computation of the CPU can be reduced by changing the frequency of face detection processing on the basis of a watching situation, the high-performance operation system is not required. Furthermore, since the amount of computation of the CPU can be reduced by changing the frequency of face detection processing on the basis of a watching situation, it is possible to prevent the increase of the power consumption of the image display device 100. Further, in the present invention, it goes without saying that the frequency of face detection processing is not limited to such an example. Furthermore, in the present embodiment of the present invention, the interval of the face detection processing of the case where it is determined that at least one person is watching the image displayed on the display panel 102 is adopted to become longer. However, in the present invention, the interval of the face detection processing of the case where it is determined that at least one person is watching the image displayed on the display panel 102 may be adopted to become shorter.

Further, in the aforementioned example, the frequency of face detection processing of the image which the image input unit 104 captures is changed by the presence of face detection. The present invention is, however, not limited to such an example. By simply making the processing frequency as well as a region where the face is searched variable, it is possible to further optimize the face detection processing. For example, as a result of the face detection processing at a certain point in time, if the face is detected, the face detection processing may be carried out in such a manner that the face is limited within a given range of front, back, right, and left of the position at which the face is detected, and then the frequency of face detection processing of the image which the image input unit 104 captures is raised (e.g. the frequency of 2 to 3 frames at one time). Further, as a result of the face detection processing at a certain point in time, when the face is not detected, the face detection processing may be carried out on an entire region of the image which the image input unit 104 captures at a frequency (e.g. of 10 to 15 frames at one time) smaller than the frequency at which the face is detected. In this way, the frequency and target of face detection processing is changed by the presence of face detection, and thereby it is possible to carry out the face detection processing that is efficient and has high immediate responsiveness.

[3-2] Pseudo Display of a Three-Dimensional Image

Figure 10:
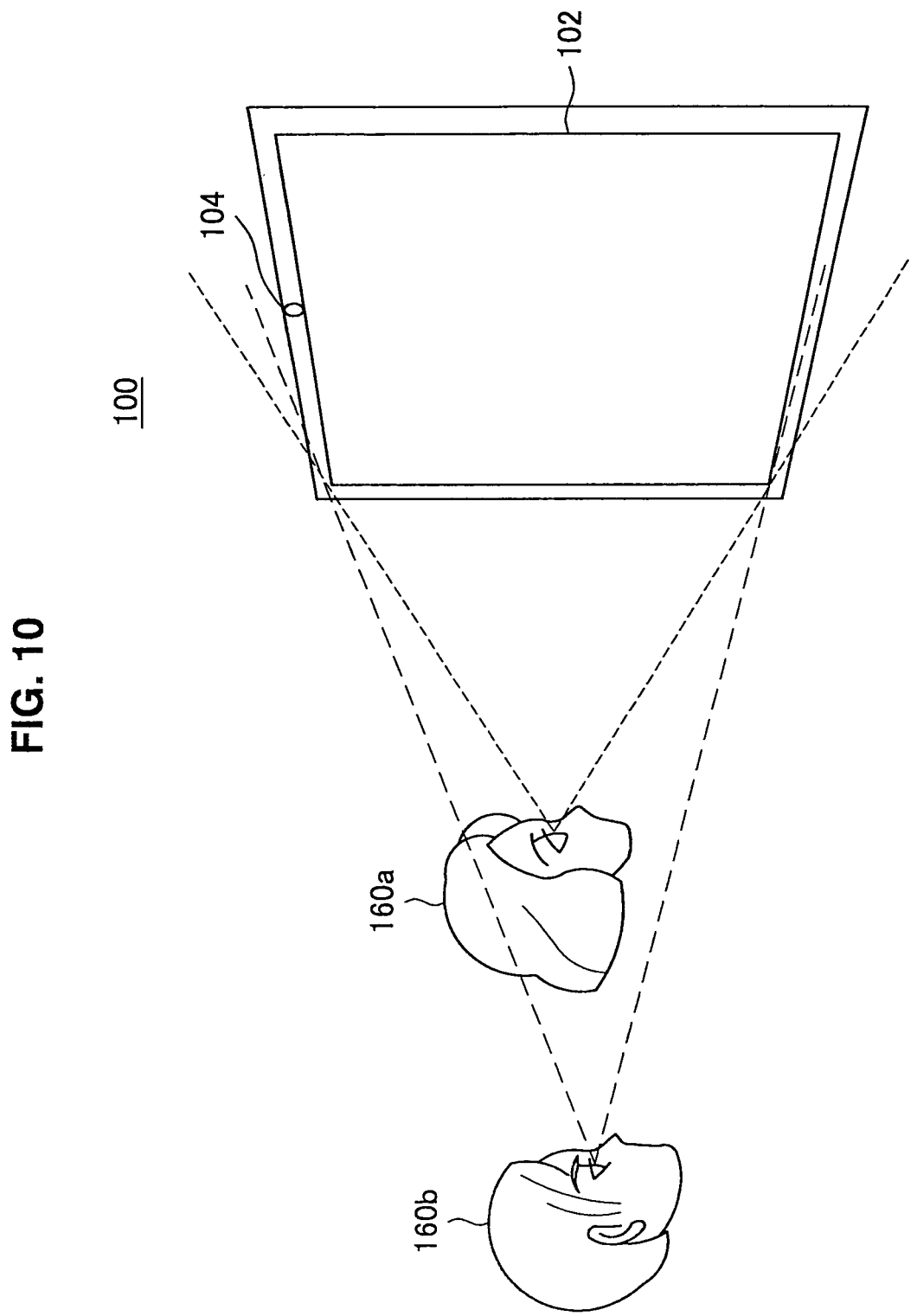
FIG. 10 is an explanatory diagram showing another modification of face detection processing in the image display device 100 according to an embodiment of the present invention.

FIG. 10 is an explanatory diagram showing another modification of face detection processing of the face detection unit 106 in the image display device 100 according to an embodiment of the present invention. The explanatory diagram shown in FIG. 10 shows the case where a pseudo-three-dimensional image is displayed using the image display device 100 according to an embodiment of the present invention. In the related art, to display the three-dimensional image, an image display device for displaying a moving image (content), which is made as the three-dimensional image, as the three-dimensional image was required. However, the provision of this content or image display device caused a threshold for enjoying the three-dimensional image to become high, so that it was impossible to enjoy the three-dimensional image with ease. Accordingly, the user's face contained in the image input by the image input unit 104 is detected by the face detection unit 106, and a visible region of the image to be displayed on the display panel 102 is changed by a position of the detected face. Thereby, the pseudo-three-dimensional image is displayed.

In the example shown in FIG. 10, in the case where a face is located at a position indicated by a symbol 160a and in the case where another face is located at a position indicated by a symbol 160b, when the display panel 102 is considered as a window, ranges viewed through the display panel 102 are different from each other. Thus, the face detection unit 106 carries out the face detection processing and distance measurement processing, and the visible region of the image to be displayed on the display panel 102 is changed depending on either a position of the face or a position or a distance between the display panel and a viewer. Thereby, it is possible to display the pseudo-three-dimensional image on the display panel 102.

To display the pseudo-three-dimensional image on the display panel 102, only the image corresponding to a part other than a surrounding part of the image displayed by the panel drive signal supplied to the display panel 102 may be adopted to be displayed on the display panel 102. For example, only the image corresponding to a range of about 80% of horizontal and vertical directions of the image displayed by the panel drive signal supplied to the display panel 102 may be adopted to be displayed on the display panel 102. The region to be displayed is changed depending on a change in the position of the face of the viewer, and thereby it is possible to change the visible region of the image. As a result, it is possible to display the pseudo-three-dimensional image on the display panel 102.

For example, in the case where the image is displayed on the display panel 102, when the viewer lowers his/her face from a certain position, the image displayed on the display panel 102 moves upwards. Thereby, it is possible to look at the pseudo-three-dimensional image. Similarly, when the viewer raises his/her face from a certain position, the image displayed on the display panel 102 moves downwards. When the viewer turns his/her face from a certain position to the left, the image displayed on the display panel 102 moves to the right. When the viewer turns his/her face from a certain position to the right, the image displayed on the display panel 102 moves to the left. Thereby, it is possible to see the pseudo-three-dimensional image.

In this way, the face detection unit 106 carries out the face detection processing and distance measurement processing. The range of the image to be displayed on the display panel 102 is controlled using the results of the face detection processing and distance measurement processing, and the range of the image displayed on the display panel 102 is changed depending on a change in the distance between the position of the face and the display panel 102. This control and change enables the viewer to feel as if the image is displayed inside the display panel 102, although the image is not made so as to display the three-dimensional image, and allows the image display device 100 to provide the image to the viewer so as to be seen in a three-dimensional form.

[3-3] Automatic Switchover of a Channel

Figure 11:
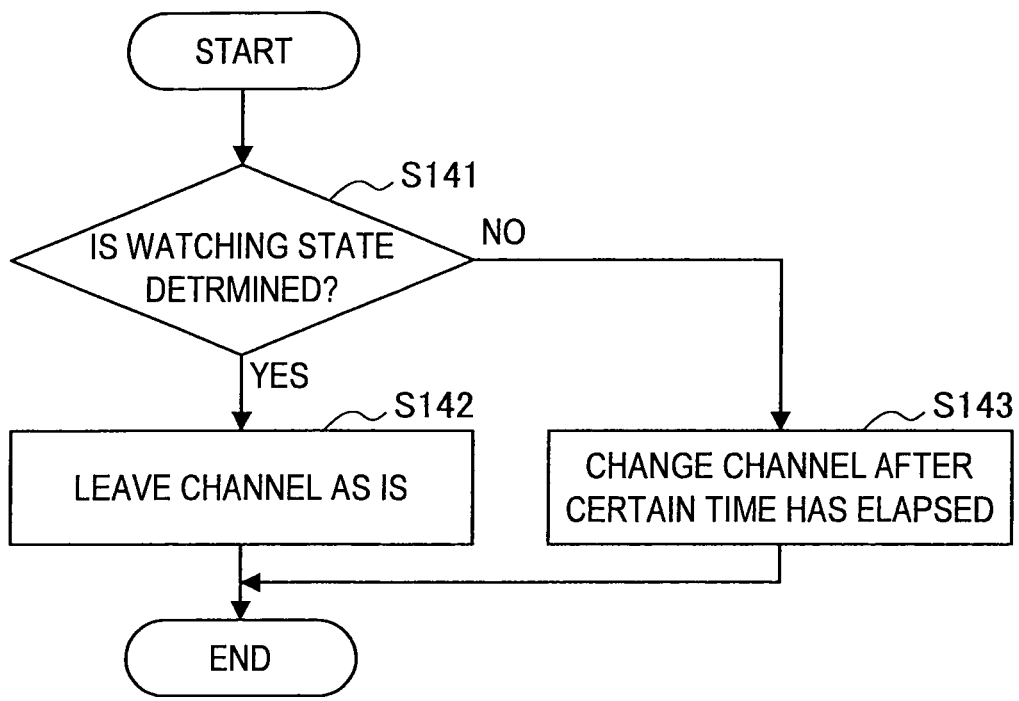
FIG. 11 is a flow chart explaining another modification of face detection processing in the image display device 100 according to an embodiment of the present invention.

FIG. 11 is a flow chart explaining another modification of face detection processing of the face detection unit 106 in the image display device 100 according to an embodiment of the present invention. Hereinafter, another modification of the face detection processing of the face detection unit 106 in the image display device 100 according to an embodiment of the present invention will be described using FIG. 11.

The flow chart shown in FIG. 11 serves to determine whether a channel of the moving image to be displayed on the display panel 102 is automatically switched over according to whether or not the user's face is contained in the image input by the image input unit 104 in the course of the face detection processing of the face detection unit 106. In the related art, the switchover of the channel (zapping) was performed by the user directly operating a body of the image display device or a remote controller. In the modification shown here, by the face detection processing of the face detection unit 106, the channel is not changed if the user's face is contained in the image input by the image input unit 104, and the channel is sequentially switched over if the user's face is not contained in the image input by the image input unit 104, i.e. when it is determined that no one is watching the moving image.

First, the face detection unit 106 determines whether the user's face is contained in the image input by the image input unit 104 and someone is watching the moving image displayed on the display panel 102 (step S141).

As a result of the determination of step S141, when the face detection unit 106 determines that the user's face is contained in the image input by the image input unit 104 and that someone is watching the moving image displayed on the display panel 102, the channel is left as is (step S142). On the other hand, when the face detection unit 106 determines that no one is watching the moving image displayed on the display panel 102, the channel is changed in turn after a predetermined time has elapsed (step S143). For example, a method of changing the channel may ascend in channel number or may descend in channel number. Further, when the channel goes around, the switchover to another broadcasting (e.g., in the order of analog broadcasting, terrestrial digital broadcasting, broadcasting satellite (BS) digital broadcasting, and communication satellite (CS) digital broadcasting) may be performed to change the channel in turn.

In this way, the zapping processing is performed using the result of the face detection processing of the face detection unit 106, so that it is possible to give more content watching opportunities to the user in an easy and simple manner. Further, in the aforementioned example, the case where more content watching opportunities are given by switching over the channel has been described. However, the present invention is not limited to such an example. For example, the case where a recording and playback device that stores content and another content server is connected to the image display device 100 is taken into consideration. In such a case, as a result of the face detection processing of the face detection unit 106, when it is determined that content in playback is not being watched, the content may be controlled to stop playing back the content that is being displayed on the display panel 102 and then play back other content.

[3-4] Volume Control Corresponding to a Distance

Figure 12:
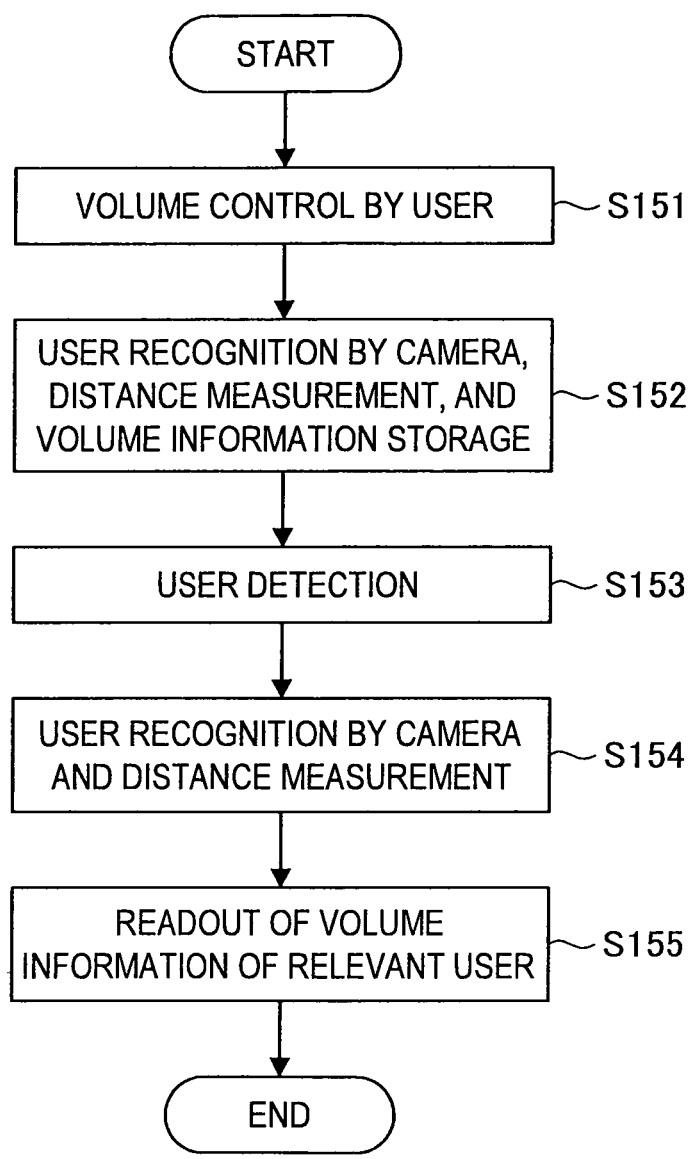
FIG. 12 is a flow chart explaining another modification of face detection processing in the image display device 100 according to an embodiment of the present invention.

FIG. 12 is a flow chart explaining another modification of face detection processing of the face detection unit 106 in the image display device 100 according to an embodiment of the present invention. Hereinafter, another modification of the face detection processing of the face detection unit 106 in the image display device 100 according to an embodiment of the present invention will be described using FIG. 12.

The flow chart shown in FIG. 12 shows a method of estimating a distance between the user and the image display device 100 in the course of the face detection processing of the face detection unit 106 and adjusting a volume on the basis of the estimated distance. In the related art, when a user becomes distant from a screen or near to the screen, it was necessary to operate a remote controller to adjust volume in order to make the volume suitable. Further, the suitable volume was made different by a user, but there was a problem in that the volume should be adjusted to each user. Thus, the face detection unit 106 carries out the face detection processing, and performs detection of a user and measurement of a distance between the user and the image display device 100 by means of the detected face and the area of a face occupied in the image. Then, the control of the suitable volume is performed by the detected user and the measured distance.

First, the volume is controlled by the user of the image display device 100 (step S151). When the volume is controlled by the user, the image display device 100 captures a face of the user who has controlled the volume by means of the image input unit 104, and simultaneously recognizes the face of the user who has controlled the volume by means of the face detection unit 106, and furthermore stores information about the volume controlled by the user (step S152). When the volume information is stored, a distance between the user and the image display device 100 is measured by the face detection unit 106, and it is desired to store information about the measured distance in connection with the volume information or information about the user.

Afterwards, when the face detection processing is initiated in the image display device 100 (step S153), the face of the user of the image display device 100 is captured by the image input unit 104. When the face of the user of the image display device 100 is captured, the face detection unit 106 carries out the face detection processing to recognize the user using the captured image, and simultaneously measures the distance between the user and the image display device 100 (step S154).

Then, by the recognized user and the measured distance between the user and the image display device 100 in step S154, the volume information of the user is read out, and a volume of sound output from the speaker 142 is set (step S155). Further, the readout of the volume information of the user and the setting of the volume of sound output from the speaker 142 may be performed by, for instance, the CPU 114.

In this way, the face of the user of the image display device 100 is captured by the image input unit 104, and the face detection unit 106 carries out the face detection processing to recognize the user using the captured image, and simultaneously measures the distance between the user and the image display device 100, so that it is possible to be automatically set to the volume suitable for the user. Further, the recognition of the user and the distance measurement are performed using the volume adjustment of the user as a trigger, so that it is possible to store the volume information in the interior of the image display device 100 without a burdensome operation.

Figure 13:
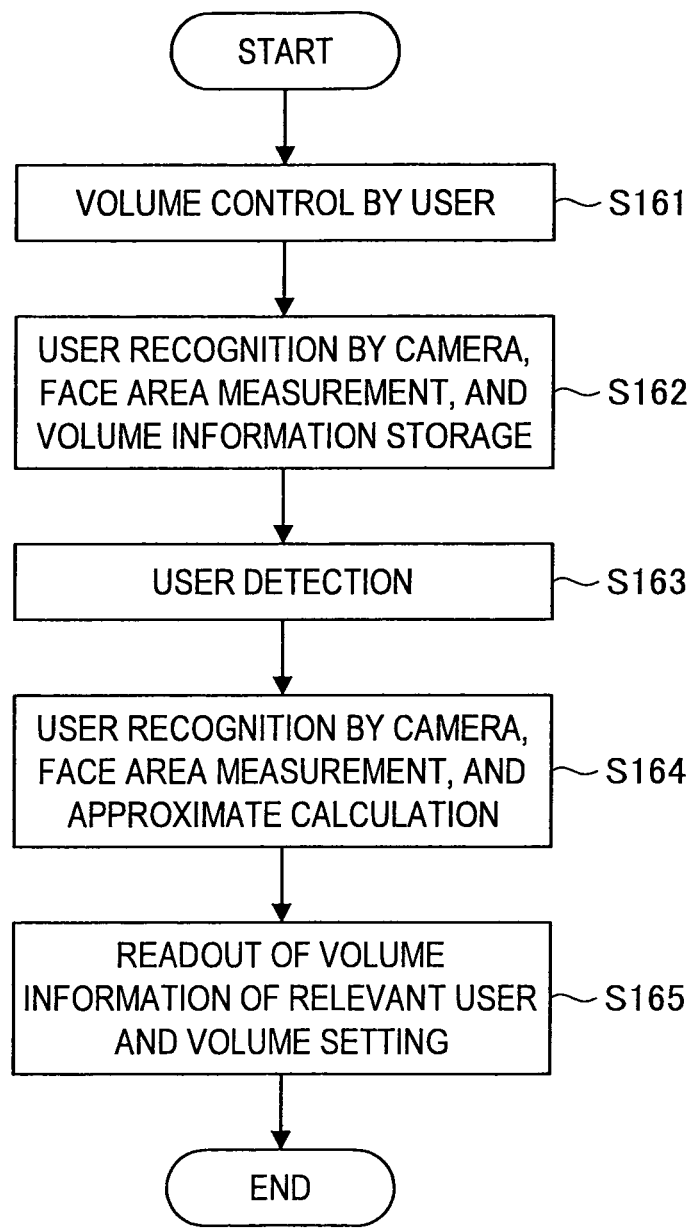
FIG. 13 is a flow chart explaining another modification of face detection processing in the image display device 100 according to an embodiment of the present invention.

FIG. 13 is a flow chart explaining another modification of face detection processing of the face detection unit 106 in the image display device 100 according to an embodiment of the present invention. Hereinafter, another modification of the face detection processing of the face detection unit 106 in the image display device 100 according to an embodiment of the present invention will be described using FIG. 13.

Like the flow chart shown in FIG. 12, the flow chart shown in FIG. 13 shows a method of estimating a distance between the user and the image display device 100 in the course of the face detection processing of the face detection unit 106 and adjusting volume on the basis of the estimated distance. In FIG. 13, using information about an area of the face detected by the face detection unit 106 and about the direction of a visual line when the face detection unit 106 carries out the face detection processing, the area of the face is approximately calculated when the user is directed to the front of the display panel 102, and then the information about the calculated face area and the information about the volume are stored, and the stored face area information and volume information are used to control the volume.

First, the volume is controlled by the user of the image display device 100 (step S161). When the volume is controlled by the user, the image display device 100 captures a face of the user who has controlled the volume by means of the image input unit 104, and simultaneously recognizes the face of the user who has controlled the volume by means of the face detection unit 106, and furthermore stores information about the volume controlled by the user (step S162). When the volume information is stored, the face detection unit 106 approximately calculates an area of the face from the area of the face occupied in the image input by the image input unit 104 and from the direction of a visual line when the user is directed to the front of the display panel 102. Further, to make a relationship between the area of the face and the volume into a linear relationship, user recognition, face area measurement, and volume information storage may be performed on the same user at least two times.

Afterwards, when the face detection processing is initiated in the image display device 100 (step S163), the face of the user of the image display device 100 is captured by the image input unit 104. When the face of the user of the image display device 100 is captured, the face detection unit 106 carries out the face detection processing to recognize the user using the captured image, and approximately calculates the area of the face from the area of the face occupied in the image input by the image input unit 104 and from the direction of the visual line when the user is directed to the front of the display panel 102 (step S164).

When the user recognition, the face area measurement, and the approximate calculation are completed in step S164, readout of the volume information of the user and setting of the volume are performed (step S165). Further, when a plurality of users are detected by the face detection unit 106 in step S164, the readout of the volume information of the user whose face has the largest area and the setting of the volume may be performed. Further, when a plurality of pieces of volume information or face area information are stored in step S162, the volume may be set using the nearest face area.

In this way, the face of the user of the image display device 100 is captured by the image input unit 104, and the face detection unit 106 carries out the face detection processing to recognize the user using the captured image, and simultaneously calculates the face area of the user, so that it can be automatically set to the volume suitable for the user. Further, the recognition of the user and the calculation of the face area are performed using the volume adjustment of the user as a trigger, so that it is possible to store the volume information in the interior of the image display device 100 without a burdensome operation.

[3-5] Playback Control of Content

Figure 14:
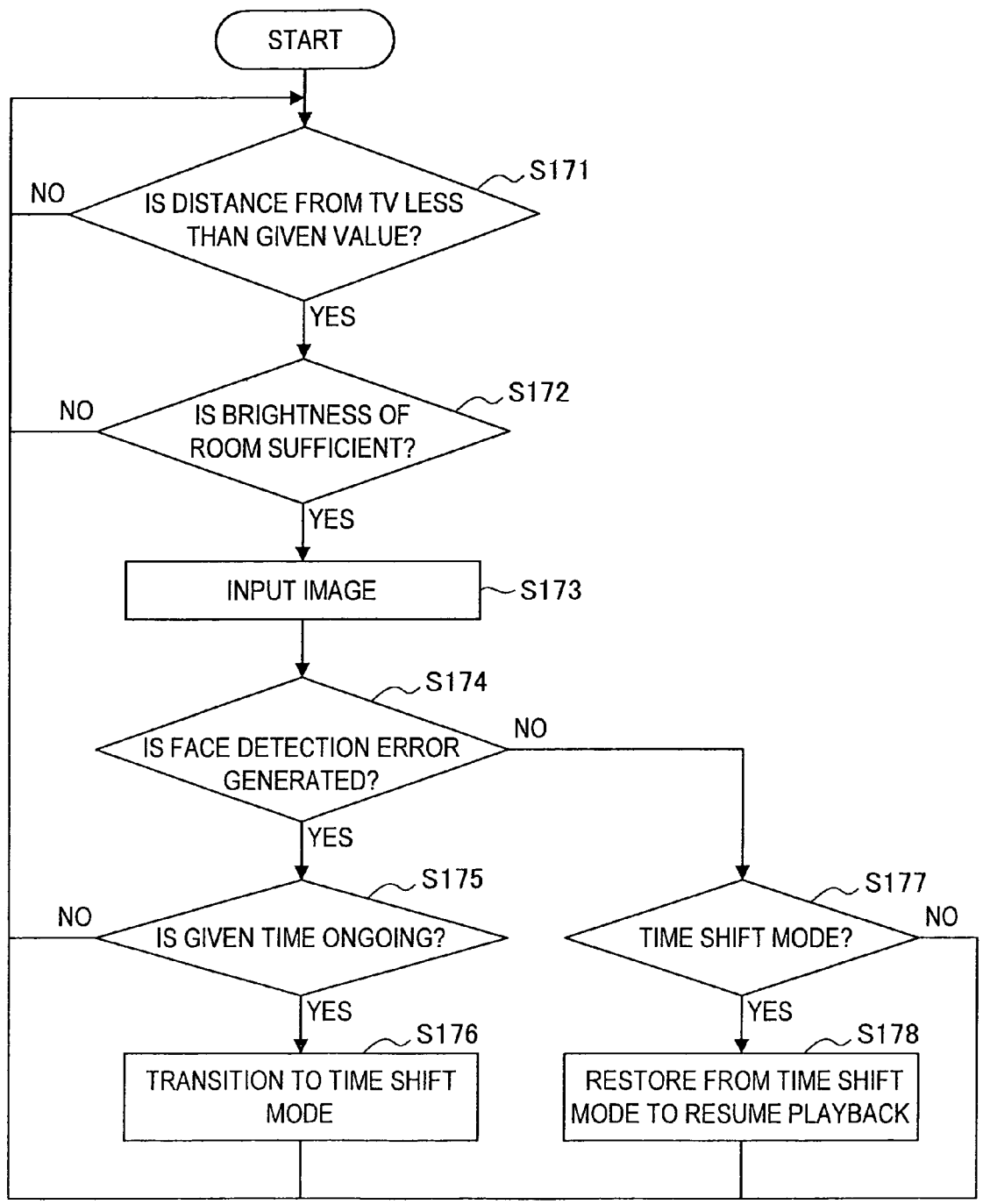
FIG. 14 is a flow chart explaining another modification of face detection processing in the image display device 100 according to an embodiment of the present invention.

FIG. 14 is a flow chart explaining another modification of face detection processing of the face detection unit 106 in the image display device 100 according to an embodiment of the present invention. Hereinafter, another modification of the face detection processing of the face detection unit 106 in the image display device 100 according to an embodiment of the present invention will be described using FIG. 14.

The flow chart shown in FIG. 14 shows a method where the face detection unit 106 carries out the face detection processing on the image captured by the image input unit 104, and as a result of the face detection processing, according to whether there is a person watching the video displayed on the display panel 102, the playback of content is controlled. In the related art, when a user temporarily left the front of TV while watching content such as a drama because of a phone call or the use of a toilet, it was necessary for the user to press a button such as a pause button using a remote controller in person and thereby stop the playback of content. Thus, when the user returned to the front of the TV to watch the content again, it was necessary for the user to press a playback button directly using the remote controller and thereby start the playback of the content again. For this reason, the modification shown in FIG. 14 is characterized in that it is unnecessary for the user to perform any operation, it is determined from the face detection processing whether there is a person watching the video displayed on the display panel 102, and the playback of content is controlled using a result of the determination.

When a moving image is captured by the image input unit 104, the moving image captured by the image input unit 104 is analyzed by the face detection unit 106, and a distance between the user and the image display device 100 is measured from the area of a face of the user occupied in the moving image captured by the image input unit 104. As a result of the measurement, the face detection unit 106 determines whether the measured distance is nearer than a predetermined distance (step S171). Further, the distance between the image display device 100 and the viewer may not be strictly measured, and may be measured within an approximate range (e.g., the position of the face is 2.5 m to 3 m distant from the image input unit 104).

As a result of the determination of the face detection unit 106 in step S171, if the measured distance is nearer than the predetermined distance, this is not controlled by the power control unit 108. The process returns to step S171, and the determination processing of the face detection unit 106 is repeated. On the other hand, as a result of the determination of the face detection unit 106 in step S171, if the measured distance is farther than the predetermined distance, it is subsequently detected whether the brightness of the captured image reaches a given brightness, i.e. whether the brightness of a room where the image display device 100 is installed reaches a given brightness (step S172). As described above, in the determination of whether the given brightness is reached, an average value of the image is obtained by a CCD image sensor, for instance, when the image input unit 104 is made up of the CCD image sensor. Thus, the CPU 114 may determine whether the obtained average value of the image is more than a given value.

When the process of detecting whether the brightness of the room reaches the given brightness is performed in step S172, the image from the image input unit 104 is subsequently input into the face detection unit 106 (step S173), and the face detection unit 106 carries out a process of detecting the face of a user.

Here, when the face detection unit 106 carries out the process of detecting the user's face, a face detection error, i.e. whether no user's face is present in the image input from the image input unit 104, is determined (step S174). As a result of the determination of step S174, when no user's face is present in the image input from the image input unit 104, and the face detection error is generated from the face detection unit 106, it is subsequently determined whether the face detection error lasts for a given time (e.g. 1 minute) (step S175).

As a result of the determination of step S175, when the face detection error lasts for the given time, the transition from an operation mode of the image display device 100 to a time shift mode is made by the power control unit 108 (step S176). When the transition from the operation mode of the image display device 100 to the time shift mode is made by the power control unit 108, the process returns to step S171 to determine the distance.

Here, the time shift mode in the present embodiment has been described. The time shift mode in the present embodiment refers to a mode that performs the control of stopping the playback of the content which the user has watched, lowers the luminance of the backlight of the display panel 102, and dims the display of the display panel 102.

As a result of the determination of step S175, when one or more user's faces are present in the image input from the image input unit 104, and the face detection error is not generated from the face detection unit 106, i.e. when someone is looking at the moving image displayed on the display panel 102, it is determined, for instance, by the power control unit 108 whether the operation mode of the image display device 100 is the time shift mode at that point in time (step S177). As a result of the determination of step S177, when it is determined that the operation mode of the image display device 100 is not the power saving mode, the process returns to step S171 to determine the distance. On the other hand, as a result of the determination of step S177, when it is determined that the operation mode of the image display device 100 is the time shift mode, a process of restoring from the time shift mode and starting the playback of the content whose playback has been stopped in step S176 is carried out (step S178). In the course of the restoration from the time shift mode, the process of restoring the lowered luminance of the backlight of the display panel 102 is also performed at the same time.

In this way, the playback of the content is controlled by a result of the face detection processing, so that it is possible to stop the playback of the content without any operation when the user moves to be distant from the front of the screen, and furthermore it is possible to restart the playback of the content from the stopped position without any operation when the user returns to the front of the screen. Further, when the user moves to be distant from the front of the screen, the luminance of the backlight of the display panel 102 is lowered, so that it is possible to contribute to reducing the power consumption.

[3-6] Setting of a Mark to Content

Figure 15:
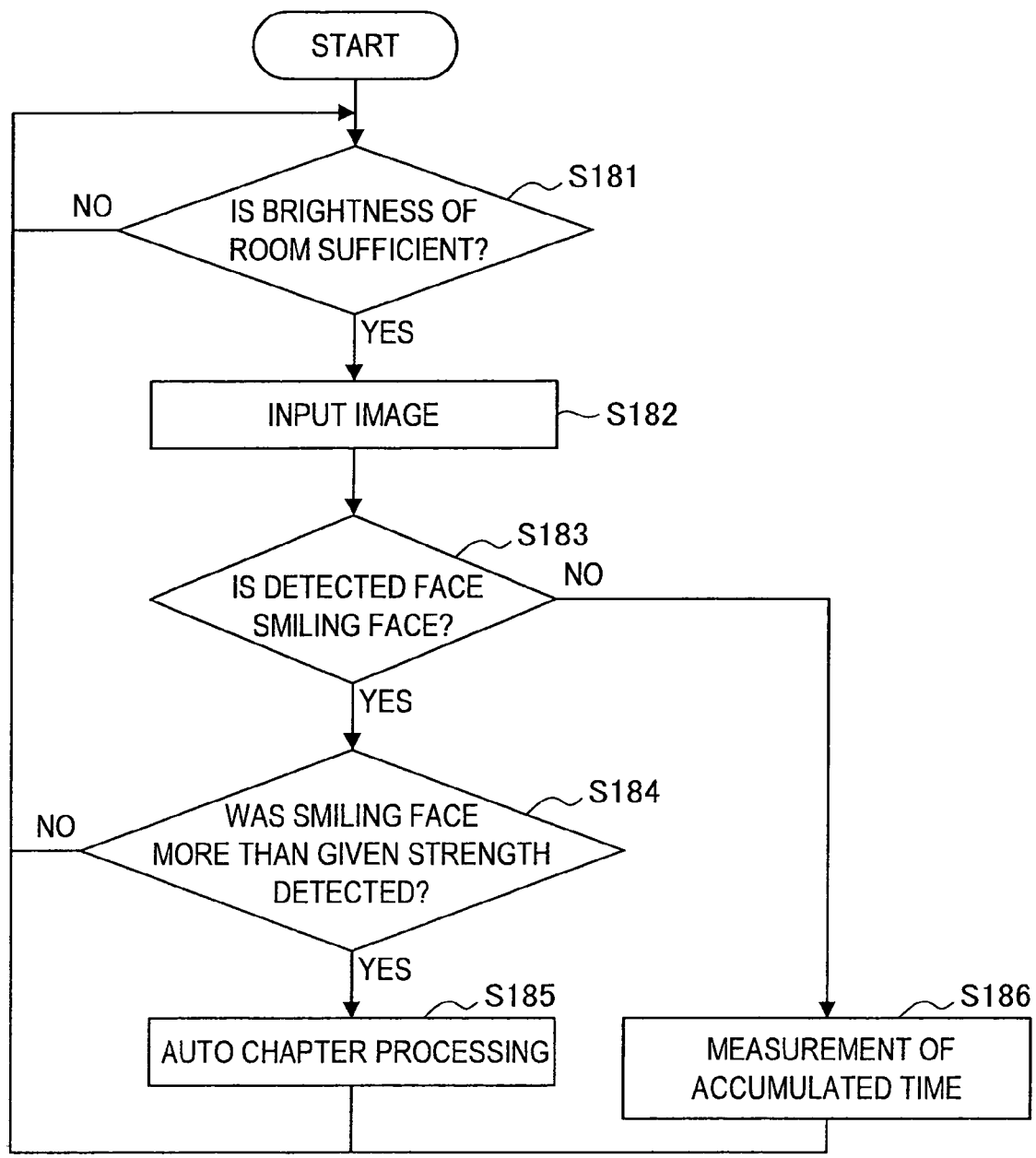
FIG. 15 is a flow chart explaining another modification of face detection processing in the image display device 100 according to an embodiment of the present invention.

FIG. 15 is a flow chart explaining another modification of face detection processing of the face detection unit 106 in the image display device 100 according to an embodiment of the present invention. Hereinafter, another modification of the face detection processing of the face detection unit 106 in the image display device 100 according to an embodiment of the present invention will be described using FIG. 15.

The flow chart shown in FIG. 15 is a chart where the face detection unit 106 carries out the face detection processing on the image captured by the image input unit 104, and as a result of the face detection processing, according to whether the detected face is a smiling face, a mark (chapter) is put on content that is being watched. In the related art, since the behaviors of a human being who laughed or produced a sound while watching the content were not preserved, there was no alternative but to play back the content from the beginning in order to specify a place to which he/she showed any reaction when watching the same content again, and it took time to find a desired scene. For this reason, the modification shown in FIG. 15 is characterized in that, as a result of the face detection processing, according to whether the detected face is the smiling face, the mark (chapter) is put on the content that is being watched, and thereby the desired scene is configured to be easily found compared to the related art.

First, when content is played back, and the content that is being played back is displayed on the display panel 102, it is detected whether the brightness of the captured image reaches a given brightness, i.e. whether the brightness of a room where the image display device 100 is installed reaches a given brightness (step S181). As described above, in the determination of whether the brightness of the room reaches the given brightness, an average value of the image is obtained by a CCD image sensor, for instance, when the image input unit 104 is made up of the CCD image sensor. Thus, the CPU 114 may determine whether the obtained average value of the image is more than a given value.

When the process of detecting whether the brightness of the room reaches the given brightness is performed in step S181, the image from the image input unit 104 is subsequently input into the face detection unit 106 (step S182), and the face detection unit 106 carries out a process of detecting the face of a user. Thus, as a result of the detection of the user's face in the face detection unit 106, the face detection unit 106 determines whether the detected face is a smiling face (step S183).

As a result of the determination of step S183, when the face detection unit 106 determines that the detected face is the smiling face, the face detection unit 106 subsequently determines whether the smiling face is more than a given strength (step S184). As a result of the determination of step S184, when the face detection unit 106 determines that the smiling face is more than the given strength, auto chapter processing where a chapter is set for the content that is being played back is carried out (step S185). Further, a place where a chapter is set may be the moment the smiling face begins or a little before the smiling face begins (e.g. 15 seconds before). By setting the chapter at the point in time a little before the smiling face begins, it is possible to enjoy the content from the point in time a little before the smiling face begins. On the other hand, as a result of the determination of step S184, when it is determined that the smiling face is not more than the given strength, the process returns to step S181 to detect the brightness of the room.

On the other hand, as a result of the determination of step S183, when the face detection unit 106 determines that the detected face is not the smiling face, a process of measuring an accumulated time of non-laughing times is carried out by, for instance, the CPU 114 (step S186). When the process of measuring the accumulated time of the non-laughing times is carried out, the process returns to step S181 to detect the brightness of the room.

In this way, as a result of the face detection processing, according to whether the detected face is the smiling face, the mark (chapter) is put on the enjoyed content, so that it is possible to easily find the desired scene. Further, the mark (chapter) is put at the point in time when a loud laugh rather than a smile is given, so that it is possible to reduce the number of marks (chapters). In addition, the accumulated time of the non-laughing times is measured, so that it is possible to detect a percentage of the laughing time or the non-laughing time in unit of the content, and it is possible to check whether the content is interesting after enjoying the content. Further, although the accumulated time of the non-laughing times is measured in the modification shown in FIG. 15, the accumulated time of the laughing times may be measured at the same time.

Further, in the aforementioned example, as a result of the face detection processing, the mark is put on the content according to whether the detected face is the smiling face. However, in the present invention, a type of the face when the mark is put on the content is not limited to such an example. Further, the content setting the mark is not limited to a moving image. For example, when still images are sequentially displayed on the display panel 102 (when a so-called slide show processing is carried out), the mark may be set for the image to which the user shows reaction.

[3-7] Detection of Watching Situation of Content

Figure 16:
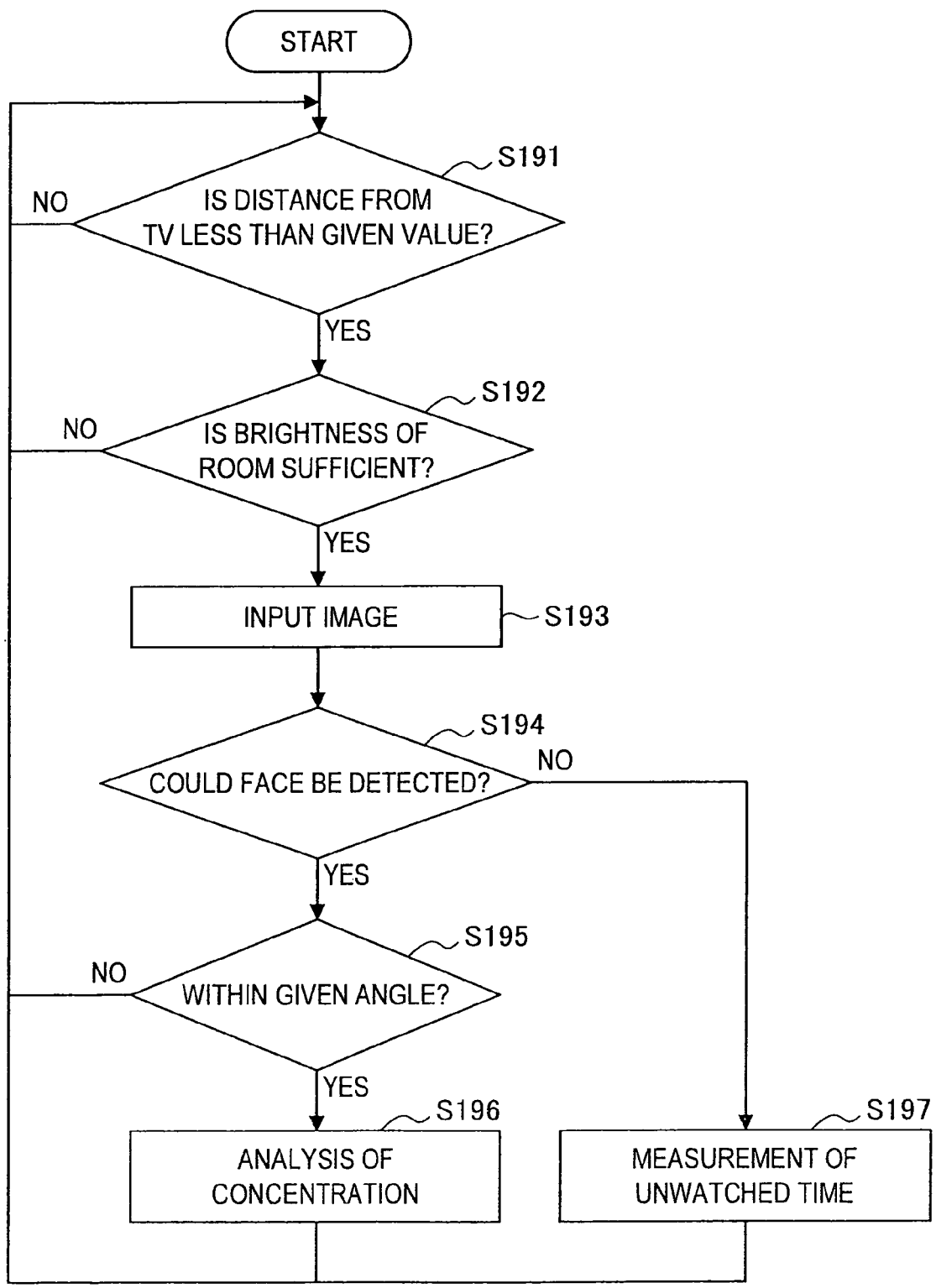
FIG. 16 is a flow chart explaining another modification of face detection processing in the image display device 100 according to an embodiment of the present invention.

FIG. 16 is a flow chart explaining another modification of face detection processing of the face detection unit 106 in the image display device 100 according to an embodiment of the present invention. Hereinafter, another modification of the face detection processing of the face detection unit 106 in the image display device 100 according to an embodiment of the present invention will be described using FIG. 16.

The flow chart shown in FIG. 16 is a chart where the face detection unit 106 carries out the face detection processing on the image captured by the image input unit 104, and as a result of the face detection processing, on the basis of the number of persons watching or the situation of reaction of persons watching, the detection of the watching situation or the watching control of the content is performed. In the related art, the watching situation of a user was detected by only the selection situation of a channel. However, it was determined from only the selection situation of the channel that content was being watched in spite of not actually being watched. Further, it was impossible to detect information about how long the content was watched. For this reason, the modification shown in FIG. 16 is characterized in that, as a result of the face detection processing, on the basis of the number of persons watching or the situation of reaction of persons watching, the detection of the watching situation or the watching control of the content is performed.

When a moving image is captured by the image input unit 104, the moving image captured by the image input unit 104 is analyzed by the face detection unit 106, and a distance between the user and the image display device 100 is measured from the area of a face of the user occupied in the moving image captured by the image input unit 104. As a result of the measurement, the face detection unit 106 determines whether the measured distance is nearer than a predetermined distance (step S191). Further, the distance between the image display device 100 and the viewer may not be strictly measured, and may be measured within an approximate range (e.g., the position of the face is 2.5 m to 3 m distant from the image input unit 104).

As a result of the determination of the face detection unit 106 in step S191, if the measured distance is nearer than the predetermined distance, this is not controlled by the power control unit 108. The process returns to step S191, and the determination processing of the face detection unit 106 is repeated. On the other hand, as a result of the determination of the face detection unit 106 in step S191, if the measured distance is farther than the predetermined distance, it is subsequently detected whether the brightness of a room where the image display device 100 is installed reaches a given brightness (step S192). As described above, in the determination of whether the given brightness is reached, an average value of the image is obtained by a CCD image sensor, for instance, when the image input unit 104 is made up of the CCD image sensor. Thus, the CPU 114 may determine whether the obtained average value of the image is more than a given value.

When the process of detecting whether the brightness of the room reaches the given brightness is performed in step S192, the image from the image input unit 104 is subsequently input into the face detection unit 106 (step S193), and the face detection unit 106 carries out a process of detecting the face of a user.

Here, the face detection unit 106 carries out the process of detecting the user's face, and it is determined whether the user's face can be detected from the image input from the image input unit 104 (step S194). As a result of the determination of step S194, when the user's face can be detected from the image input from the image input unit 104, it is determined whether the user's face that can be detected in step S194 is within the range of a given angle with respect to the image input unit 104 (step S195).

As a result of the determination of step S195, when it is determined that the user's face is not within the range of the given angle with respect to the image input unit 104, the process returns to step S191 to carry out the distance measurement processing again. On the other hand, as a result of the determination of step S195, when it is determined that the user's face is within the range of the given angle with respect to the image input unit 104, a process of analyzing the concentration on content is carried out (step S196). The analysis of the concentration on the content refers to an analysis of whether the content is being concentrated on and watched by analyzing the direction of a visual line of the user's face detected by, for instance, the face detection unit 106. As an example of a method of calculating the concentration, the concentration may be calculated by dividing a time for which the visual line of the user's face is directed to the image input unit 104 by a playback time of the content. When the concentration is calculated by such a method, the longer the time for which the direction of the visual line is directed to the image input unit 104, the higher the concentration, whereas the shorter the time for which the direction of the visual line is directed to the image input unit 104, the lower the concentration. Further, as the analysis of the concentration on the content, a process of analyzing the movement of a vertical direction (pitch direction) of the user's face detected by, for instance, the face detection unit 106, and determining the presence of nodding or the nodding place, and the nodding frequency of a viewer with respect to details of the content may be carried out. When the concentration is analyzed by such a method, the concentration may become high as the nodding frequency increases.

Then, as a result of analyzing the concentration on the content, when the concentration on the content that is currently displayed is low, i.e. when it is determined that no great interest is taken in the content that is currently displayed, other content may be recommended to be watched, or the displayed content may be switched over.

Further, in the course of the recommendation of the content, the recommended content may be decided on the basis of information about the number of persons, gender, etc. which are obtained by the face detection processing of the face detection unit 106 which is carried out on the image input from the image input unit 104.

On the other hand, as a result of the determination of step S194, when the user's face cannot be detected from the image input from the image input unit 104, it is determined that the content is displayed but not watched, and a process of measuring a non-watching time of the content is carried out by, for instance, the CPU 114 (step S197). When the process of measuring the non-watching time of the content is carried out, the process returns to step S191 to carry out the distance measurement processing again.

In this way, the face detection unit 106 carries out the process of detecting the user's face, and the process of analyzing the concentration on the content is carried out using a result of the detection. Thereby, it is possible to detect detailed watching situations of the content that is currently displayed, or to perform the playback control of the content on the basis of the concentration obtained by the analysis.

[4] CONCLUSION

A variety of modifications applied to the face detection processing of the face detection unit 106 have been described above. As described above, the image display device 100 according to an embodiment of the present invention includes the image input unit 104 that captures the image of the same direction as the direction where the display panel 102 displays the moving image, and the face detection unit 106 that carries out the face detection processing on the image which the image input unit 104 captures. Thus, the presence of the detection of the user's face by the face detection unit 106 is able to control the operation of the interior of the image display device 100 and to contribute to reducing the power consumption. Further, it is possible to analyze the watching situation of the content displayed by the display panel 102 and to control the playback of the content displayed by the display panel 102 using information about the size or direction, direction of the visual line, etc. of the face detected by the face detection unit 106.

The preferred embodiments of the present invention have been described above with reference to the accompanying drawings, whilst the present invention is not limited to the above examples, of course. A person skilled in the art may find various alternations and modifications within the scope of the appended claims, and it should be understood that they will naturally come under the technical scope of the present invention.

For example, as a result of the face detection processing of the face detection unit 106, when it is a child that is projected on the image supplied from the image input unit 104, or when it is detected that the distance between the image input unit 104 and the face is within a given distance, effects such as shading, messages or sounds may be produced for the moving image displayed on the display panel 102, and attention may be called such that the user moves away from the front of the display panel 102.

The invention claimed is:

1. An image display device comprising:
a processing device that controls:
displaying a still image or a moving image;
capturing an image in a direction in which the still image or the moving image is displayed; and
carrying out face detection processing, in which a face of a user which is included in the image captured is detected, at given intervals, and in which the face detection processing is carried out on a variable region of the image captured,
wherein the face detection processing is performed (i) at a first frequency and on a first region of the image captured, when the face of the user is not detected in the image captured, and (ii) at a second frequency and on a second region of the image captured, when the face of the user is detected in the image captured, and
wherein when the detected face undergoes no change in position in whole or in part for a given time in the course of the face detection processing, the processing device does not detect the face as the face of the user.

2. The image display device according to claim 1, wherein the processing device controls the displaying according to a result of the face detection processing of the face detection unit,
wherein, as a result of the face detection processing, when the face of the user is not included in the image captured, the processing device reduces luminance of the displaying.

3. The image display device according to claim 2, wherein, when the face of the user is not included in the image captured, the given intervals are increased compared to when the face of the user is included.

4. The image display device according to claim 2, wherein the processing device reduces the luminance after a given time has elapsed after it is determined that the face of the user is not included in the image captured.

5. The image display device according to claim 2, wherein the processing device detects brightness of an installed room using the image captured, and does not reduce the luminance of the when the brightness of the room does not reach a given value.

6. The image display device according to claim 2, wherein, after reducing the luminance, the processing device raises the luminance when the face of the user is adopted to be included in the image captured.

7. The image display device according to claim 2, wherein, when a given time has elapsed after the luminance is reduced, the processing device partially or wholly omits image processing of the image displayed.

8. The image display device according to claim 2, wherein, when it is determined that the face of the user is included in the image captured but the user shuts his/her eyes, the processing device reduces the luminance after a given time has elapsed from the determination.

9. The image display device according to claim 1, wherein the processing device performs a control operation on the still image or the moving image according to a result of the face detection processing, and
changes a range of the image to be displayed according to a position of the face which the processing device detects and a distance of the face from an image capturing device.

10. The image display device according to claim 1, wherein the processing device performs a control operation on the still image or the moving image according to a result of the face detection processing, and
selects the image to be displayed according to a situation of the face which the processing device detects.

11. The image display device according to claim 1, wherein the processing device performs a control operation on the still image or the moving image according to a result of the face detection processing, and
controls whether or not a high-resolution conversion processing is performed on the image to be displayed according to whether or not the face which the processing device detects is present.

12. The image display device according to claim 1, wherein the processing device performs a control operation on the still image or the moving image according to a result of the face detection processing, and
automatically and sequentially switches over channels to be displayed according to whether or not the face which the processing device detects is present.

13. The image display device according to claim 1, wherein the processing device controls:
outputting an audio;
performing a control operation on the audio according to a result of the face detection processing; and
volume of the audio output according to a situation of the face which the processing device detects.

14. The image display device according to claim 13, wherein the processing device controls the volume of the audio output according to a direction and area of the face which the processing device detects.

15. The image display device according to claim 14, wherein the processing device calculates the area of the face from the direction and area of the face which the processing device detects when the face is directed toward a front direction, and controls the volume of the audio output using a result of the calculation.

16. The image display device according to claim 1, wherein the processing device
performs a control operation on the still image or the moving image according to a result of the face detection processing, and, as a result of the face detection processing, when it is determined that the face of the user is not included in the image captured by the image, temporarily stops playing back the moving image displayed.

17. The image display device according to claim 1, wherein the processing device
performs a control operation on the still image or the moving image according to a result of the face detection processing, and
as a result of the face detection processing, when it is determined that the face detected by the processing device shows a reaction to the image displayed, sets a mark for the image.

18. The image display device according to claim 17, wherein the processing device sets a chapter as the mark when the image displayed is the moving image.

19. The image display device according to claim 18, wherein the processing device sets the chapter at a point in time that goes back a given time from a point in time when the face detected by the processing device shows the reaction.

20. The image display device according to claim 1, wherein the processing device performs a control operation on the still image or the moving image according to a result of the face detection processing, and
obtains an enjoying situation of the image displayed using the result of the face detection processing.

21. The image display device according to claim 20, wherein the processing device selects the image to be displayed according to the enjoying situation.

22. The image display device according to claim 1, further comprising a detection sensor for detecting a user when the user is beyond a viewing angle of the image capturing unit.

23. The image display device according to claim 1, wherein the face detection processing includes determining a distance between the image display device and a user.

24. The image display device according to claim 1, wherein the first frequency is less than the second frequency and the second region is smaller than the first region.

25. The image display device according to claim 1, wherein, as a result of the face detection processing, when the face of the user is not included in the image captured, the processing device controls changing of a power consumption of the image display device on a basis of elapsing of time from when the image display device transitions to a power saving mode.

26. A control method comprising the steps of:
capturing an image in a direction where an image display unit for displaying a still image or a moving image displays the still image or the moving image; and
carrying out face detection processing, in which a face of a user which is included in the image captured in the capturing step is detected, at given intervals, to detect the face, and in which the face detection processing is carried out on a variable region of the image captured,
wherein the face detection processing is performed (i) at a first frequency and on a first region of the image captured, when the face of the user is not detected in the image captured in the image capturing step, and (ii) at a second frequency and on a second region of the image captured, when the face of the user is detected in the image captured in the image capturing step, and
wherein the step of detecting the face does not detect the face as the face of the user when the detected face undergoes no change in position in whole or in part for a given time in the course of the face detection processing.

27. A non-transitory computer readable medium encoded with a computer program for causing a computer to execute the steps of
capturing an image in a direction where an image display unit for displaying a still image or a moving image displays the still image or the moving image, and
carrying out face detection processing, in which a face of a user which is included in the image captured in the capturing step is detected, at given intervals, to detect the face, and in which the face detection processing is carried out on a variable region of the image captured,
wherein the face detection processing is performed (i) at a first frequency and on a first region of the image captured, when the face of the user is not detected in the image captured in the image capturing step, and (ii) at a second frequency and on a second region of the image captured, when the face of the user is detected in the image captured in the image capturing step, and
wherein the step of detecting the face does not detect the face as the face of the user when the detected face undergoes no change in position in whole or in part for a given time in the course of the face detection processing.

* * * * *